US010102012B2

(12) United States Patent
Harrison

(10) Patent No.: US 10,102,012 B2
(45) Date of Patent: Oct. 16, 2018

(54) DYNAMICALLY CONFIGURABLE WORKFLOW IN A MOBILE ENVIRONMENT

(71) Applicant: Record360, Inc., Newark, DE (US)

(72) Inventor: Gregory Harrison, Seattle, WA (US)

(73) Assignee: RECORD360 INC., Seattle, WA (US)

( * ) Notice: Subject to any disclaimer, the term of this patent is extended or adjusted under 35 U.S.C. 154(b) by 0 days.

(21) Appl. No.: 14/937,763

(22) Filed: Nov. 10, 2015

(65) Prior Publication Data
US 2016/0132299 A1   May 12, 2016

Related U.S. Application Data

(60) Provisional application No. 62/078,816, filed on Nov. 12, 2014.

(51) Int. Cl.
*G06F 9/445* (2018.01)
*G06F 8/41* (2018.01)
*G06F 8/61* (2018.01)
*G06F 8/71* (2018.01)

(52) U.S. Cl.
CPC .......... *G06F 9/44505* (2013.01); *G06F 8/427* (2013.01); *G06F 8/61* (2013.01); *G06F 8/71* (2013.01)

(58) Field of Classification Search
CPC ... G06F 8/61; G06F 8/427; G06F 8/71; G06F 9/44505
See application file for complete search history.

(56) References Cited

U.S. PATENT DOCUMENTS

| 7,889,931 B2 | 2/2011 | Webb et al. |
| 8,699,779 B1 | 4/2014 | Prasad et al. |
| 8,712,893 B1 | 4/2014 | Brandmaier et al. |

(Continued)

OTHER PUBLICATIONS

Lubeck et al., System and Method for Content Collection, Cataloging, and Collaboration, Sep. 14, 2014, U.S. Appl. No. 62/046,043, Specification p. 16, paragraph 123.*

(Continued)

*Primary Examiner* — Jacob D Dascomb
(74) *Attorney, Agent, or Firm* — Shook, Hardy & Bacon, L.L.P.

(57) ABSTRACT

Embodiments are directed to a mobile application that enables a completely and dynamically configurable workflow. Once installed on a mobile computer, the application is completely configurable without re-compiling the application. A user may configure the "look & feel," as well as the workflow of a particular instance of the application, via configuration templates. Once the application is downloaded and installed in an executable form, the user may configure and/or reconfigure the workflow and the "look and feel" of the application without a re-compiling operation and/or generating new machine-code to enable the configuration. To configure and/or reconfigure the application, the user need only to edit and/or receive additional configuration templates. The execution of the configured workflow is not dependent upon the mobile computer being in communication with another network computer. The mobile application may be a native application. Accordingly, the completely customizable mobile application may be executed in an "offline" mode.

20 Claims, 13 Drawing Sheets

(56) References Cited

U.S. PATENT DOCUMENTS

| | | |
|---|---|---|
| 8,750,682 B1 | 6/2014 | Nicksay et al. |
| 2003/0120509 A1 | 6/2003 | Bruch et al. |
| 2004/0054600 A1 | 3/2004 | Shike et al. |
| 2004/0103145 A1* | 5/2004 | Jenkins ............... G06F 8/00 709/203 |
| 2004/0230439 A1 | 11/2004 | Aptekar |
| 2004/0260594 A1 | 12/2004 | Maddox, Jr. |
| 2005/0125771 A1* | 6/2005 | Vitanov ............... G06F 8/35 717/104 |
| 2005/0144018 A9 | 6/2005 | Aptekar |
| 2005/0155027 A1* | 7/2005 | Wei ............... G06F 8/44 717/162 |
| 2005/0251427 A1 | 11/2005 | Dorai et al. |
| 2007/0198311 A1 | 8/2007 | Menendez et al. |
| 2008/0183535 A1 | 7/2008 | Kahana |
| 2009/0187817 A1 | 7/2009 | Ivashin et al. |
| 2011/0040681 A1 | 2/2011 | Ahroon |
| 2011/0040692 A1 | 2/2011 | Ahroon |
| 2012/0105197 A1 | 5/2012 | Kobres |
| 2012/0173890 A1* | 7/2012 | Root ............... G06F 1/1632 713/300 |
| 2012/0284704 A1* | 11/2012 | Friedman ............... G06F 8/61 717/177 |
| 2015/0039466 A1 | 2/2015 | Skinner |
| 2015/0067458 A1 | 3/2015 | Skinner |
| 2015/0186988 A1 | 7/2015 | Skinner |
| 2015/0212814 A1* | 7/2015 | Fransen ............... H04L 67/10 717/122 |
| 2016/0070777 A1* | 3/2016 | Lubeck ............... G06F 17/3087 707/740 |

OTHER PUBLICATIONS

U.S. Appl. No. 62/046,043, Specification and Drawings filed Sep. 4, 2014.*

* cited by examiner

```
{
   "Template":{
      "Name":"Company A Template",
      "ID":"20140101.99",
      "Version":"x.y.z",
      "Canvas":{
         "Font":"Arial",
         "BGColor":"#0033CC",
         "TextColor":"#FFFFFF",
         "TextBGColor":"#0033CC",
         "RefNumTitle":"Order ID:",
         "LogoID":"78040"
      }
   }
}
```

FIG. 7A

```
{
   "Template":{
      "Name":"Company A Template",
      "ID":"20140101.99",
      "Version":"x.y.z",
      "N2":{
         "ModuleRef":"Notation2",
         "Description":"Notation - Radio Options - Scratch (autonav),Dent
(autonav),Other(Text Entry)",
         "Hint":"True",
         "HintInfo":{
            "Title":"Notation Entry",
            "Text":"Select from the available optional notations or navigate
to the prior/next image using a swipe action or by touching the left/right
navigation icons.",
            "NavBar":"True",
            "NavBarText":"Notate",
         },
         "OptionSets":"1",
         "OptionSet1":{
            "Type":"RadioOptions",
            "Options":"3",
            "Option1":{
               "Prompt":"Scratch",
               "AutoNav":"True"
            },
            "Option2":{
               "Prompt":"Dent",
               "AutoNav":"True"
            },
            "Option3":{
               "Prompt":"Other",
               "AutoNav":"False"
            }
         }
      }
   }
}
```

FIG. 7B

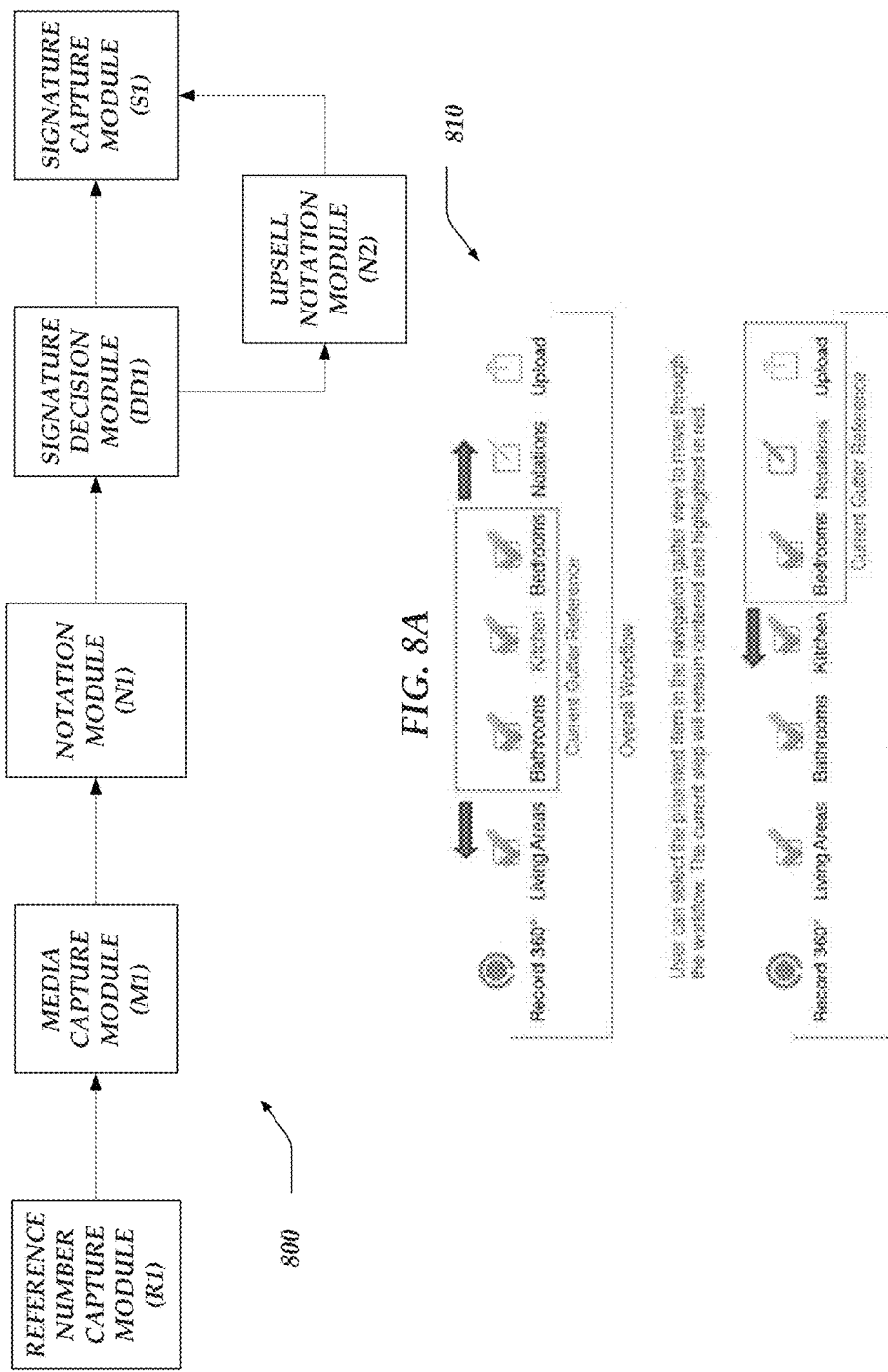

```
"Template":{
    "Name":"Company A Template",
    "ID":"20140101.99",
    "version":"x.y.z",
    "Workflow":"P1,M1,N1,DD1,N2,S1,N3,S2",
    "DD1":{
        "ModuleRef":"Decision",
        "Description":"Decision Dialog - Yes/No/Cancel",
        "Hint":"False",
        "DialogTitle":"Example Decision Dialog",
        "DialogText":"This is where the text describing the available options would appear.",
        "NavBar":"False",
        "Options":"3",
        "Option1":{
            "Prompt":"Yes",
            "Action":"S1"
        },
        "Option2":{
            "Prompt":"No",
            "Action":"N2"
        },
        "Option3":{
            "Prompt":"Cancel",
            "Action":"Cancel"
        },
        ...
```

FIG. 8C

| Macro | Description |
|---|---|
| {REFNUM} | Captured Transaction Reference Number |
| {REFNUMEXISTS} | Captured Transaction Reference Number Already Exists in DB (TRUE/FALSE) |
| {RETURN} | Transaction represents a "Return" type of transaction |
| {DAMAGE} | Indicates Return transaction identified damage (TRUE/FALSE) |
| {TRANSACTIONLINK} | A link to the transaction |
| {USERID} | User ID of the person capturing the Transaction |
| {ALLNOTATIONS} | An ordered display of all applied notations |

*FIG. 9A*

| Macro | Description |
|---|---|
| {REFNUM} | Captured Transaction Reference Number |
| {REFNUMEXISTS} | Captured Transaction Reference Number Already Exists in DB (TRUE/FALSE) |
| {RETURN} | Transaction represents a "Return" type of transaction |
| {DAMAGE} | Indicates Return transaction identified damage (TRUE/FALSE) |
| {TRANSACTIONLINK} | A link to the transaction |
| {USERID} | User ID of the person capturing the Transaction |
| {USERNAME} | User "FirstName LastName" of the person capturing the Transaction |
| {ALLNOTATIONS} | An ordered display of all applied notations |
| {TRANSACTIONDATETIME} | Date/Time of transaction upload, as formatted: Sep 24, 2014 @ 11:10 PDT |

*FIG. 9B*

| Metadata Item | System Variable | Description |
|---|---|---|
| Reference Number | [REFNUM] | The captured Transaction Reference Number |
| Is Rental | N/A | Transaction represents a typical Rental/Check-out type of transaction |
| Is Return | [RETURN] | Transaction represents a "Return" type of transaction |
| Is Damaged | [DAMAGE] | Indicates the return transaction identified damage□User ID |
|  | [USERID] | User ID of the person capturing the Transaction |
| Location ID | N/A | Location ID of the company capturing the Transaction |
| Company ID | N/A | Company ID of the company capturing the Transaction |
| Created Datetime | N/A | Datetime of transaction capture/upload |
| Updated Datetime | N/A | Datetime of last edit to transaction |
| General Metadata | N/A | General metadata captured at the transaction level. This could be checklist data, Vehicle or Property information, etc. |
| Geo Location |  | Geo location information sufficient to plot/link via online mapping tools like Google Maps, etc. |

*FIG. 9C*

- IsVisible: If true, then the module will be displayed in the App. The module contains defined prompts below for SendToList and/or TextEntry, and the "Send" button. If false, the module is not visible within the workflow but automatically generates the email summary as defined.
- SendToTextEntry: true/false, defines whether or not to show text prompt for comma-separated email entry.
- SendToTextDefault: Optional, defines what email address(es) will be defaulted into the SendToTextEntry textbox. Also defines the SendTo email address(es) when the IsVisible option is set to false.
- IncludeImageInline: true/false – defines whether to send transaction images as visible HTML images within the email body. Please refer to the existing web portal's email transaction summary functionality, which is identical to this element.
- IncludeImageDownloadLink: true/false – defines whether to include a link to download a zip'd set of all transaction images in the email. Please refer to the existing web portal's email transaction summary functionality, which is identical to this element.
- IncludeVideoDownloadLink: true/false – defines whether to include a link to view/download all video(s) from the transaction. Please refer to the existing web portal's email transaction summary functionality, which is identical to this element.
- IncludeBCC: Optional. Defines a comma-separated list of hard-coded email address(es) to be applied to the BCC of the email.

*FIG. 9D*

```
{
    "id":1,
    "key":"E1",
    "name":"Email Transaction Summary Module",
    "IsVisible":"true",
    "SendToTextEntry":"true",
    "SendToTextDefault":"foo@bar.com,john.smith@any.com",
    "IncludeBCC":"email1@company.com,email2@company",
    "IncludeImageInline":"true",
    "IncludeImageDownloadLink":"true",
    "IncludeVideoDownloadLink":"true",
    "Label":"Press the Send Email button to send a transaction summary email to the selected recipient(s).",
    "Button":"Send Email",
    "Email":{
        "Subject":"SomeCompany Rental Check-Out Summary for Contract: {RefNum}",
        "Body":"User: <b>{USERID}</b> has completed a transaction identified by <b>{REFNUM}<b> on <TRANSACTIONDATETIME>.<BR><BR>Notations Summary:<BR>{ALLNOTATIONS}",
        "FromEmail":"SomeCompany Rentals"
    },
    "tab_bar_item":{
        "id":1,
        "image_name":"emailDisabled.png",
        "title":"Send Email",
        "url":""
    }
},
```

*FIG. 10A*

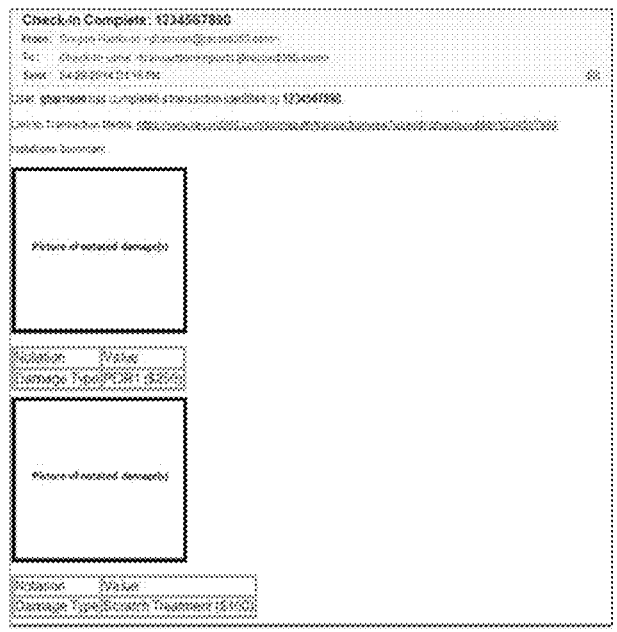

DYNAMICALLY CONFIGURABLE WORKFLOW IN A MOBILE ENVIRONMENT

PRIORITY CLAIM

This patent application claims the priority of U.S. Provisional Patent Application Ser. No. 62/078,816, entitled USER CONFIGURABLE WORKFLOW IN A MOBILE ENVIRONMENT, filed on Nov. 12, 2014, the contents of which are hereby incorporated by reference.

FIELD OF THE INVENTION

The disclosure relates generally to a mobile environment and specifically to enabling a user to dynamically configure a workflow presented in a mobile environment.

BACKGROUND OF THE INVENTION

Applications developed for mobile environments are extremely popular. Some mobile applications enable a user to configure a limited number of options or preferences. However, once downloaded to a particular mobile device, the user's ability to define or otherwise vary a workflow within the application is limited. In many instances, it may be advantageous to enable a particular user to vary a workflow within a single application. Accordingly, a need exists for a user configurable workflow in a mobile environment. It is for these and other concerns that the following disclosure is offered.

BRIEF DESCRIPTION OF THE DRAWINGS

Preferred and alternative examples of the present invention are described in detail below with reference to the following drawings:

FIG. 7A shows a portion of an exemplary embodiment of a configuration template that configures an application canvas for a mobile application;

FIG. 7B shows a portion of an exemplary embodiment of a configuration template that includes module-specific instructions for a notation module that is included in a workflow configured for a mobile application;

FIG. 8A shows another exemplary embodiment of a user-configured workflow for a mobile computer;

FIG. 8B shows an exemplary embodiment of a gutter view of user-configured workflow for a mobile computer;

FIG. 8C shows a portion of an exemplary embodiment of a configuration template that configures the workflow of FIG. 8A;

FIG. 9A shows a table that includes a partial listing of supported system variables;

FIG. 9B shows a table that includes a partial listing of system variables and metadata supported by an email module;

FIG. 9C shows a table that includes a partial listing of system variables and metadata employed at the transaction level;

FIG. 9D shows a partial listing of system configuration template variables and parameters supported by an email module;

FIG. 10A shows a portion of an exemplary embodiment of a configuration template that configures an email module for a mobile application;

FIG. 10B shows an email message that is automatically generated and sent by an email module configured with via the portion of the configuration template shown in FIG. 10A;

FIG. 11A shows an exemplary embodiment of a user interface generated by a checklist module included in a customized workflow; and FIG. 11B shows an exemplary embodiment of a user interface generated by a notation summary and cost summation module included in a customized workflow;

DETAILED DESCRIPTION OF THE PREFERRED EMBODIMENT

Figure 1:
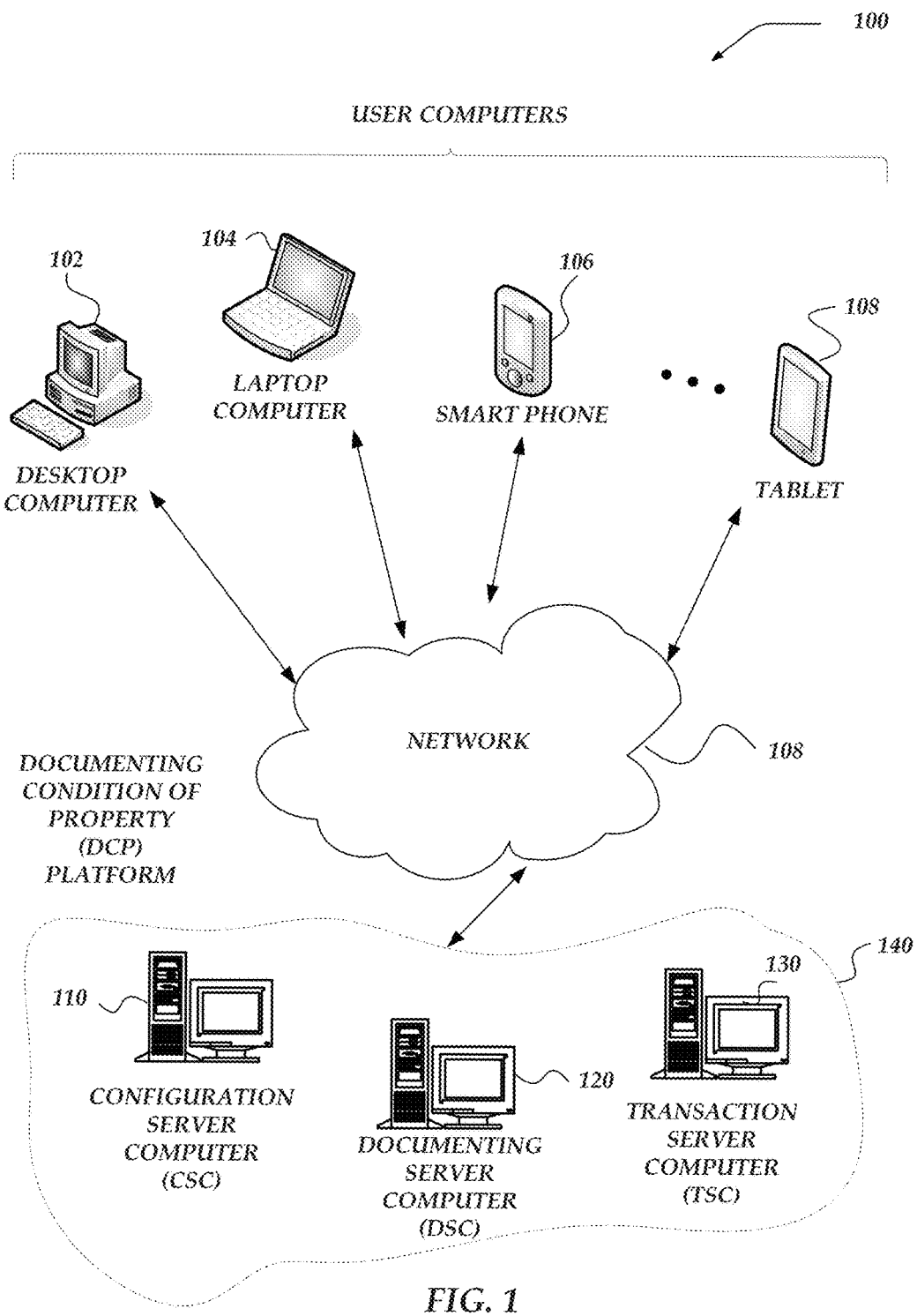
FIG. 1 is a system diagram of an environment in which embodiments of the invention may be implemented.

Various embodiments are described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may be entirely hardware embodiments, entirely software embodiments, or embodiments combining software and hardware aspects. The following detailed description should, therefore, not be limiting.

Throughout the specification and claims, the following terms take the meanings explicitly associated herein, unless the context clearly dictates otherwise. The term "herein" refers to the specification, claims, and drawings associated with the current application. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "customized configuration template," "configuration template," or simply "template" may refer any structured data that configures one or more mobile applications. In various embodiments, a configuration template may configure nearly all aspects of a user interaction with a mobile application. Such interactions include, but are not otherwise limited to the application canvas of the mobile application, the workflow of the mobile application, module-specific options and actions, dialog boxes provided to the user, localization/language support, and the like. A configuration template may be stored in JavaScript Object Notation (JSON), XML, HTML, or virtually any structured format.

As used herein, the term "application canvas" may refer to any aspect of a user interface (UI) or user experience (UX) of a configured mobile application. For instance, when configured via a configuration template, the application canvas defines fonts, background colors, text colors, text background colors, reference number titles, company logos, trademarks, and the like. The application canvas may be configured via a configuration template. The application canvas may include the "look and feel" of the mobile application.

As used herein, the term "workflow" may refer to a sequence of the modules presented to the user of a mobile application as they interact with the configured mobile application. The workflow may be completely configurable via the configuration templates. A mobile application may include a plurality of templates. The plurality of modules may be selectively indicated in one or more configuration templates to define a workflow of the mobile application. The modules may include, but are not otherwise limited to login modules, reference number capture modules, media capture modules, notation modules, decision dialog modules, logic-branch modules, transaction completion module, messaging modules, and the like.

Briefly stated, embodiments are directed to a flexible and user configurable environment that supports a variety of dynamically configurable workflow capabilities. In some embodiments, the environment includes a mobile application (the application) that enables a completely and dynamically configurable workflow. The application may run and/or execute on a mobile computer, such as but not limited to any of user computers 102-108 of FIG. 1. In at least one embodiment, the mobile application is executable on dedicated specialized hardware devices or computers.

Once installed on a mobile computer, such as but not limited to smartphone 106 or tablet 108 of FIG. 1, the application is completely configurable without re-compiling the application. When configuring the application, a user may easily configure the "look & feel," (by configuring an application canvas) as well as the workflow of a particular instance of the application, via configuration templates. Furthermore, the application is a single, maintainable mobile application. Accordingly, once the application is downloaded in an executable form, the user may easily configure a workflow of the application, as well as the "look and feel" of the application without a re-compiling operation and/or generating machine-code to enable a particular configuration of the application.

Additionally, the application, including the customizable workflow, may be entirely executed on the mobile computer. For example, the execution of the workflow is not dependent upon the mobile computer being in communication with another network computer. That is to say that the configuration templates are completely interpreted at the mobile computer to configure the mobile application at the mobile computer, without the assistance of another computer. The mobile application may be a native application for one or more mobile architectures. Thus, the various embodiments may not include web applications. Accordingly, the completely customizable mobile application may be executed in an "offline" mode.

In some embodiments, multiple, client-specific versions of the application's workflow may be created and/or maintained to support varying client requirements. Although various embodiments are directed towards workflows for property transactions, as discussed below, it is to be understood that other various embodiments are not so constrained. These embodiments may be employed for any mobile application wherein at least a workflow and/or an application canvas is configurable by a user.

In order to define the workflow, a user only needs to define an arrangement of modules, which are included in the compiled mobile application, via configuration templates. Configuration templates may include template files as one means by which the user may configure the arrangement of modules. As such, the design of the application is template-driven. Many aspects of an application canvas, observable text, navigation, workflow, and interaction behaviors is dictated by the definition the configuration templates.

A single instance of the application is capable of rendering any workflow defined for the single application instance, without the need to re-compile the application. For instance, a customer of a party that operates a platform, such as but not limited to documenting condition of property (DCP) platform 140 of FIG. 1, may define templates to configure the application for their specific workflow and "look & feel."

The user configurable workflow is composed of a subset of the modules that are included in the workflow. The subset of modules are configured in an ordered sequence, which may include branching/logic decision modules. The modules may be data objects. In such embodiments, the modules may be manipulated in ways analogous to various object oriented programming techniques. The modules may be defined and "wired-together" in various configuration template files. The workflow, as defined by the user, can incorporate any type and number of the available modules, as well as system and module-specific variables, system and module-specific metadata, and system and module-specific instructions.

Dynamically Configurable Mobile Application for Documenting the Conditions of Tangible Property As noted above, a mobile application may be dynamically configurable via a configuration template, including the application canvas, as well as the workflow of the application, at run time and without the need to re-compile the mobile application. Furthermore, the mobile application is a native application and is configured, at the mobile computer and at run time, without the need for the mobile computer to be in communication with another network computer (offline mode).

A user-configurable mobile application may be employed in a variety on contexts. For instance, in some embodiments discussed herein, a user-configurable mobile application is employed to enable a transaction involving the documenting of a condition of tangible property. However, other embodiments are not so constrained, and the various embodiments may be employed in virtually any context.

Various embodiments of multimedia and metadata capture environments are described in U.S. patent application Ser. No. 13/959,581 "SYSTEM, METHOD, AND APPARATUS FOR ASSESSING THE CONDITION OF TANGIBLE PROPERTY THAT IS LOANED, RENTED, LEASED, BORROWED, OR PLACED IN THE TRUST OF ANOTHER PERSON," (the '581 patent application) filed on Aug. 5, 2013, the entirety of which is incorporated herein by reference herein.

The '581 patent application describes various embodiments of a mobile application that is executable on a mobile computer. The mobile application enables capturing multimedia and metadata used to record and capture information pertinent to the transfer of property possession. The mobile application enables the generation of a third party transaction "of record" that documents the condition of the property at the time the asset is either purchased, rented, return, sold, etc., such that all participating parties have a undisputed, documented condition of the property at the time of transaction. The primary means of capturing this information is through the recording at least one of image data, video data, audio data, snapshots, and annotation of the asset at the time of the transaction.

Additional embodiments of mobile applications that may be dynamically configurable via the processes discussed herein are described in U.S. patent application Ser. No. 14/534,846 "SYSTEM, METHOD, AND APPARATUS FOR DOCUMENTING THE CONDITION OF TANGIBLE PROPERTY," (the '846 patent application) filed on Nov. 6, 2014, the entirety of which is incorporated herein by reference herein.

Further embodiments of mobile applications that may be dynamically configurable via the processes discussed herein are described in U.S. patent application Ser. No. 14/660,009 "SYSTEM, METHOD, AND APPARATUS FOR THE AUTOMATIC DETECTION OF PROPERTY FEATURES WHEN DOCUMENTING THE CONDITION OF TANGIBLE PROPERTY," (the '009 patent application) filed on Mar. 17, 2015, the entirety of which is incorporated herein by reference herein.

Figure 6:
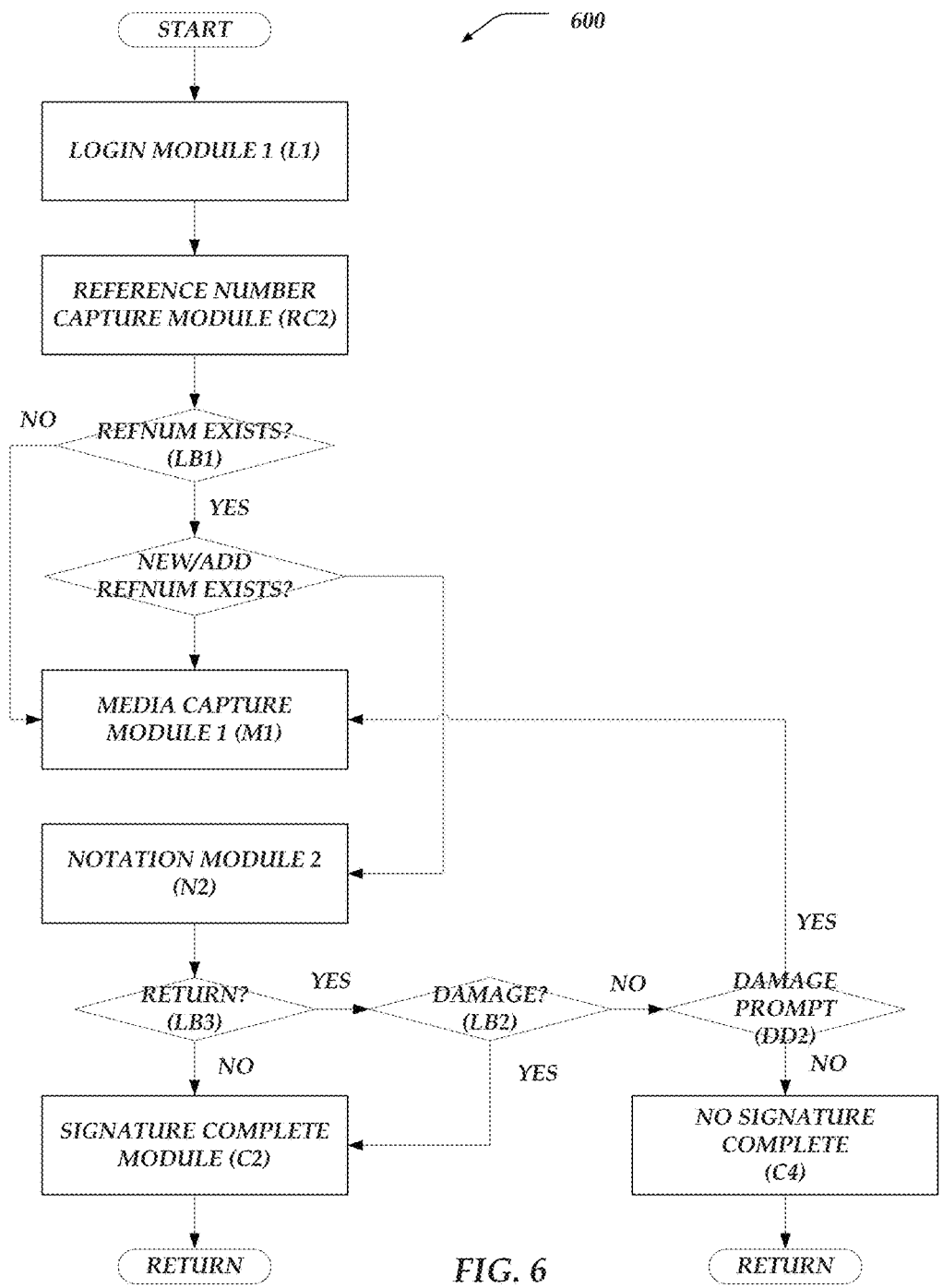
FIG. 6 shows an exemplary embodiment of a user-configured workflow for a mobile application executed on a mobile computer.

FIG. 6 shows an exemplary embodiment of a user-configured workflow 600 for a mobile application executed at a mobile computer. Workflow 600 enables property transaction that involves documenting the condition of tangible property.

Each of the elements in workflow 600 represents a user-configured module. As discussed herein, the modules include a login module (L1), a reference number capture module (RC2), various logic branch modules (LB1, LB2, LB3), various decision modules (DD1, DD2)), a media capture module (M1), a notation module (N2), and various transaction completion modules (C2, C4). Other modules are available. The modules are "wired together" in by editing various configuration templates.

When the application is executed or run on the mobile computer, one or more configuration templates are employed to configure, at run time, the mobile application, at the mobile computer, and execute workflow 600. When the mobile application is configured to execute workflow 600, a user of the mobile computer may be enabled to login, via the configured L1 module.

Upon logging in, the user may capture a property reference number, such as a contract number, vehicle identification number (VIN), asset number, or the like via the configured RC2 module. The next step in workflow 600 may enable the user to document or record the condition of the property through media or image data, such as video or still image data via the M1 module. In some embodiments, the image data is captured with the mobile computer running the mobile application.

In some embodiments, workflow 600 includes enabling the user to provide annotations for applicable image data via the N2 module. Such annotations are also configurable specific to the context of that business workflow. The user may then complete documenting the data. Documenting the data may include a transaction, such as a transfer of the property transaction. Completing the transaction may include employing the mobile device to capture data of a client signature via the C2 module.

Subsequent actions of the workflow 600 for the same asset or property (in the context of rentals, for example), may include a specific "Return" workflow step. The "Return" step may enable the user to review the prior transaction image and/or audio data (to assess the condition of the asset prior to the present return action) to determine if new damage has occurred and if so, to take capture additional media of any new damages.

The Application Templates

A user configures the application with the use of configuration templates. As such, configuration templates define many aspects of how the user configures and interacts with the application. For instance, by editing various templates, the user can define an application canvas and a workflow (the order of components). FIG. 7A shows a portion of an exemplary embodiment of a configuration template 700 that configures an application canvas for a mobile application.

The workflow may include branching and/or logic decisions. The user can also define component-specific options, actions, hint dialogs, and the like. Through templates, the user may provide language support for enabling international versions of the application.

The user-configured templates may be stored on the mobile computer that is running the mobile application. In some embodiments, the templates are stored and provided by a platform, such as but not limited to DCP platform 140 of FIG. 1. In these embodiments, the configuration templates are provided by the platform and cashed and/or stored in the mobile computer when the user initially logins the application. The mobile application may review the cached templates upon each future login and check for template updates. This enables a user-configurable "look and feel" in the application login view. Accordingly, when a different user logs into the mobile application, a different workflow may be instantiated. Additionally, the "look and feel" of the application may be varied with each user, depending upon the templates that are associated with the various users.

In some embodiments, configuration templates are configured and maintained remotely from the mobile computer that executes the mobile application. For instance, a user may edit the configuration templates through a web portal provided via a platform, such as but not limited to DCP platform 140 of FIG. 1. The web portal may be accessed via a computer that is separate from the mobile computer that executes the mobile application. For instance, the web portal may be accessed via desktop computer 102 or laptop computer 104 or any of the user computers of FIG. 1. The web portal may include an admin interface. The configuration templates may be managed by the user/client or by any third party.

The user editable templates may be stored in a cloud-like architecture, including but not limited to DCP platform 140. The application may provide at least a portion of the captured media to a remote storage environment. Appropriate authentication/security tokens may be implemented to ensure that only authorized users are able to upload or view media, and only for their specific company.

Various embodiments of platforms may support a code management system (CMS) to manage a plurality of configuration templates. In at least one embodiment, the CMS includes a simple content review/reporting environment where the user may peruse prior transaction media through (paged) list or filter/search methods. Users can generate CSV (comma-separated values) exports of a given time span of media and transaction data. An administrative layer in the platform may enable an administrator to select from a list of client accounts and "mirror" into the chosen account as if they were using a client login. The admin view will also have basic summary views on transactions and all other relevant table views to assess transaction and media volume by client account. Admin access will also have a user management interface.

Configuration templates may be assigned at a party/user/client level, such as a company or location-level. As mentioned above, the templates are loaded and cached upon initial login. This allows the application of a party specific application canvas for all subsequent logins. Note a party may include multiple users. For instance, a party may include a company and the users may be the authorized employees. Thus, the mobile application is configurable at the party level and the user level.

Upon login, the mobile application may evaluate whether an updated configuration template is required. If so, the application may retrieve the updated templates through a pull transaction. Accordingly, each template may include a distinct name and version number that is associated with a location table. Upon login, the location_id is assigned to that user_id and is identified and as the applicable template_id. The version is identified and compared to the active template in the application. If there is a difference, then the app downloads the applicable template and refreshes the application based on the updated template. This allows centralized management of company-wide or even location-specific template changes.

Configuration templates may be stored within any data format or data structure. In preferred embodiments, the templates are stored in JavaScript Object Notation (JSON). However, other embodiments are not so constrained, and other formats, such as XML or other markup languages may be utilized. Any data object or otherwise machine parsable format may be employed to encode the templates.

Module-Specific Instructions

A portion of the available modules may have some level of configuration capability beyond what is provided by the application canvas configurable capabilities. These additional capabilities may be configured, via the configuration templates, in module-specific instructions. These instructions may be defined within a configuration template, specific to the applicable module. FIG. 7B shows a portion of an exemplary embodiment of a configuration template 710 that includes module-specific instructions for a notation module that is included in a workflow configured for a mobile application.

For example, if the workflow of the application is to include a notation module, the available notations and their actions would be defined for that specific module. The template entry, again using the JSON syntax, would consist of a module workflow INSTANCE identifier (ex: C1, A2, S1, etc.), a required identifier for the module library identifier (ModuleRef) and a set of module-specific definitions to be passed to the module when loaded. Multiple instances of a module may be defined and included in the workflow, but the associated instance identifier must be unique. Behaviors for the module will also include the whether or not to render a Hint Dialog.

The Workflow Definition

The user configurable workflow is the sequence of the modules presented to the user as the application is running. The provided sequence identifies the default path. If a decision dialog is identified or if a conditional step is encountered, the workflow continues to the workflow module order after the identified module. FIG. 8A shows another exemplary embodiment of a user-configured workflow 800 for a mobile computer. For example, workflow 800 includes the R1, M1, N1, DD1, N2, and S1. Workflow 800 proceeds to either N2 or S1 based on DD1 (where each of R1, M1, N1, DD1, S1, and N2 are modules). FIG. 8C shows a portion of an exemplary embodiment of a configuration template 810 that configures the workflow of FIG. 8A. The presence of a "pipe" (|) character within the configuration template 820 defines an alternate workflow that would typically be branched to from a Logic Branch or Decision Dialog instruction.

Specific modules within a configured workflow may be identified as representing specific "steps" in the overall workflow that are tied explicitly to a gutter view or navigation. FIG. 8B shows an exemplary embodiment of a gutter view 800 of user-configured workflow for a mobile computer. The navigation icons in the application gutter view represent the current and previous/next steps, as applicable.

There are no hardwired limit to the number of workflow steps tied to the gutter. The gutter navigation icons automatically center on the active/selected workflow steps, which provide the user a visual representation of an updated sequence of workflow steps (icons). The workflow configuration template identifies whether the module is tied to a navigation step (NavBar=True/False) the relevant icon (by ModuleRef) and the specified text label to be applied to that specific workflow step (NavBarText).

In some embodiments, a user cannot skip a step in the workflow unless it has been previously completed (e.g. in a 5-step workflow, if we have completed steps 1-4, returned to edit step 2, the user can swipe the gutter to proceed to step 5). A user cannot skip a step in the workflow unless it has been previously completed (e.g. in a 5-step workflow, if we have completed steps 1-4, returned to edit step 2, the user can swipe the gutter to proceed to step 5).

Variables and Custom Metadata

Many transactions, such as property transactions, generate metadata. There are "state" values retained for the transaction, which will be considered "system variables." Additionally, at least some modules may generate one or more custom name/value pair values. System variables are retained individually at the schema level for the transaction table. Custom values are retained at the transaction and/or specific media item level. For example, media-item-specific notations are stored in the media table schema as a Text field type. At least a portion of the other custom values are stored in the transaction table as a Text field type. The structure of the contents of these Text field types, to support 1-to-N total metadata items may be as complex as JSON or as simple as delimited name/value pairs. In the workflow, at least a portion of the system and custom values may be referenced by Macro Name (for system values) or by the name of the custom metadata item. FIG. 9A shows a table that includes a partial list of supported system variables.

Module Types

A plurality of modules also fall into a grouping of functional module types. Some module types are required and perform a singular specified function; while others may be optional and/or extended by template module instructions. Non-limiting examples of functional modules include login modules, reference number capture modules, media captures modules, notation modules, decision dialog modules, logic-branch modules, and transaction completion modules.

Login Modules

Various embodiments may include at least two types of login modules that may be included in a configured workflow via a configuration template: a standard login module (L1) and a create login module (L2). A standard login module may simply allow a user to login, while a create login module may enable a user to create a user account on a platform.

When a create login module is included in a workflow, users may be emailed an account creation personal identification number (PIN) from the administrator. When selecting the Create Login option from the login module, the login module may enable the user to create a new account using the provided PIN.

The field labels are defined by the template. PIN codes are company and location-specific in the database included in the platform. As such, the creation of a new user record should map the new user record to the company and location designated by the PIN code. The create login module may or may not be applied in the configuration template's "Workflow" module list. As discussed below, other example embodiments of functional modules include a module that enables the capture of a transaction reference number, a module that enables the manual entry of text into text fields, and a module that enables the scanning of a barcode.

Reference Number Capture Modules

Various embodiments may include at least three types of reference number capture modules that may be included in a configured workflow via a configuration template: manual text entry module (RC1), bar card scanner module (RC2), and a vehicle bar code scanner module (RC3). Manual text entry module enables the manual entry of a reference number.

The bar code scanner module may scan barcodes of any property, including, but not limited to consumer goods and vehicles. Different modules may be supplied to scan different barcodes for different property types. Any type or version of a bar code, or other optically recognized 1D or 2D data object that encodes information may be supported, including, but not limited to QR-Code, Bar Code 39, Bar Code 128, and Data Matrix. For instance, with consumer goods, a bar code scanner module may include immediately below/behind the Continue button is an image display area indicating the current viewable area of the camera for a scan action. The barcode scan action should be guided by a visual area indicator and occur automatically once the barcode has been recognized. An audible "snapshot" sound may be played to indicate a code capture, which begins the workflow with the capture reference number.

For a vehicle bar code scanner module, the barcode portion of this module is may be nearly identical to the bar code scanner module in terms of scanning behavior (snapshot sound upon successful scan code detection), but is used specifically in the context of the automotive vertical. Upon scanning a VIN code (bar code or data matrix), a lookup to a third-party database of VIN information (ex: http://developer.edmonds.com/) and extracts Make/Model/Year/Trim/Color, and other such parameters/variables corresponding to the vehicle.

The automatically determined parameters/variables corresponding to the vehicle may be pre-populated into corresponding text fields on this module UI, as well as being included in the transaction metadata. As such, there are prompts for "VIN:", "Make:", "Model:", "Year:", Trim:", "Color:" and "Other:", all of which can be edited, as needed. The "Other" field can contain any additional metadata we identify in the Edmonds.com lookup and/or provide general notation ability for the user. The Scan action may scan the VIN code and populates all available text fields. A "Continue" button begins the transaction workflow.

Media Capture Modules

Media capture modules (MC) may enable the capture of media, such as image, video, and/or audio data. These modules may provide a core video and image capture function and represent the only required modules in the workflow. The entire module area consists of an image display area indicating the current viewable area of the camera, with an overlay of both a Picture and Video icons. The user has the ability to capture individual images by clicking the camera icon or by touching a specific area of interest in the viewable area. Performing the latter will capture the image with a red circle overlaid upon the image at the location of the touch point. The user may start/stop recording of video by touching the Video icon. If at any time during video recording the user presses the camera icon or touches the viewable area, an image is captured (including the red circle in the case of a touch point). The user may generate as many videos or images as needed.

Notation Modules

Various embodiments may include at least two types of notation modules that may be included in a configured workflow via a configuration template: media review only notation module (N1) and media review with configurable notations notation module (N2). After capturing media, the typical next-step in the configurable workflow is to allow the user to review the captured media. The notation modules provide a methods to peruse all captured media (using a swipe action or left/right arrow navigation icons) and in some modules, allowing the capture of specified metadata for each media item. This metadata can be applied through pre-defined, selectable "Touch Notations" (or tags, such as "Scratch, "Dent," and the like.) that are also defined within the template section for the notation module. Various embodiments of Touch Notations and/or documenting property tags are discussed in the above incorporated '846 patent application.

Some notation modules may display a "x of y" reference to indicate total media items (y) and the current media item (x). While in the notation module, a menu option (or trashcan icon) to perform delete options is provided. The "Delete Options" dialog contains text and options: "What do you want to Delete?", Options: "Current Media Item", "All Media Items", Transaction" and "Cancel".

Decision Dialog Module

In some cases, the workflow will be determined based on a prompt to the user. All aspects of the provided options, including the dialog title, text, available options and the respective option workflow actions are defined by decision dialog modules (DD) included in the various embodiments. In addition to dictating workflow branching, these modules may configure system variables and create new metadata values. A decision dialog can be created with a single option to provide a means for a simple instruction dialog.

Logic Branch Modules

Some embodiments may include logic branch modules (LB). In various embodiments, the configured workflow may be determined based on the value of a system/state variable or collected value. In addition to dictating workflow branching, these logic branch modules may configure system variables and create new metadata values. In some embodiments, branching logic may be based on or defined by an expression evaluation based on at least one or more of the native system variables or custom variables defined and captures for the specific workflow. For instance, branching logic may be based on the value or evaluation of the various variables described above in the "System Variables and Custom Metadata" section.

Transaction Completion and Email Modules

Various embodiments may include at least four types of transaction completion modules that may be included in a configured workflow via a configuration template: complete transaction module (C1), capture signature and complete transaction module (C2), complete transaction email module (E1), and no signature required complete transaction module (C4).

A signature C2 module may presents an interface to "sign" the transaction. It may be similar to other transaction completion modules, but adds an area to use the finger to provide a signature. It additionally applies a visual date/time stamp that will be captured with the digital images of the signature.

Another example of transaction completion modules includes a module (E1) that auto-generates an email message to notify one or more users that the transaction is complete. Email or E1 modules may present an interface to generate an email with a transaction summary, optionally containing inline images and a media download link, to the selected email address(es). A E1 module may exist as a visible workflow module (as a tab bar item) OR can be implemented as an automated action in the workflow (e.g. without a visible module). Multiple instances of this module can be applied to a single workflow definition. In at least some embodiments, this email operation may occur at the platform such that no local device email configuration is required at the mobile computer.

Email modules enable the visible or non-visible email auto-generation, including creating/sending an email summarizing the transaction to the specified recipient(s). The Subject, To/From/CC/BCC in the email message can all be pre-defined via the configuration template. The email body is configurable HTML, able to render any transaction metadata (system variables and/or any form field from the Form/Checklist module instance(s) as needed.

FIG. 9B shows a table that includes a partial listing of system variables and metadata supported by an email module. FIG. 9C shows a table that includes a partial listing of system variables and metadata employed at the transaction level. FIG. 9D shows a partial listing of system configuration template variables and parameters supported by an email module. FIG. 10A shows a portion of an exemplary embodiment of a configuration template that configures an email module for a mobile application. FIG. 10B shows an email message that is automatically generated and sent by an email module configured with via the portion of the configuration template shown in FIG. 10A.

Checklist Modules

Checklist modules may provide an interface that enables the workflow to include a list of checklist items. The "Label" definition identified the equivalent to an <H1> at the top of the module UI. Each group of items can have an optional "GroupLabel" equivalent to an <H3> for that group. A blank GroupLabel simply generated one blank line separating from the subsequent group, if defined.

Figures 11A, 11B:
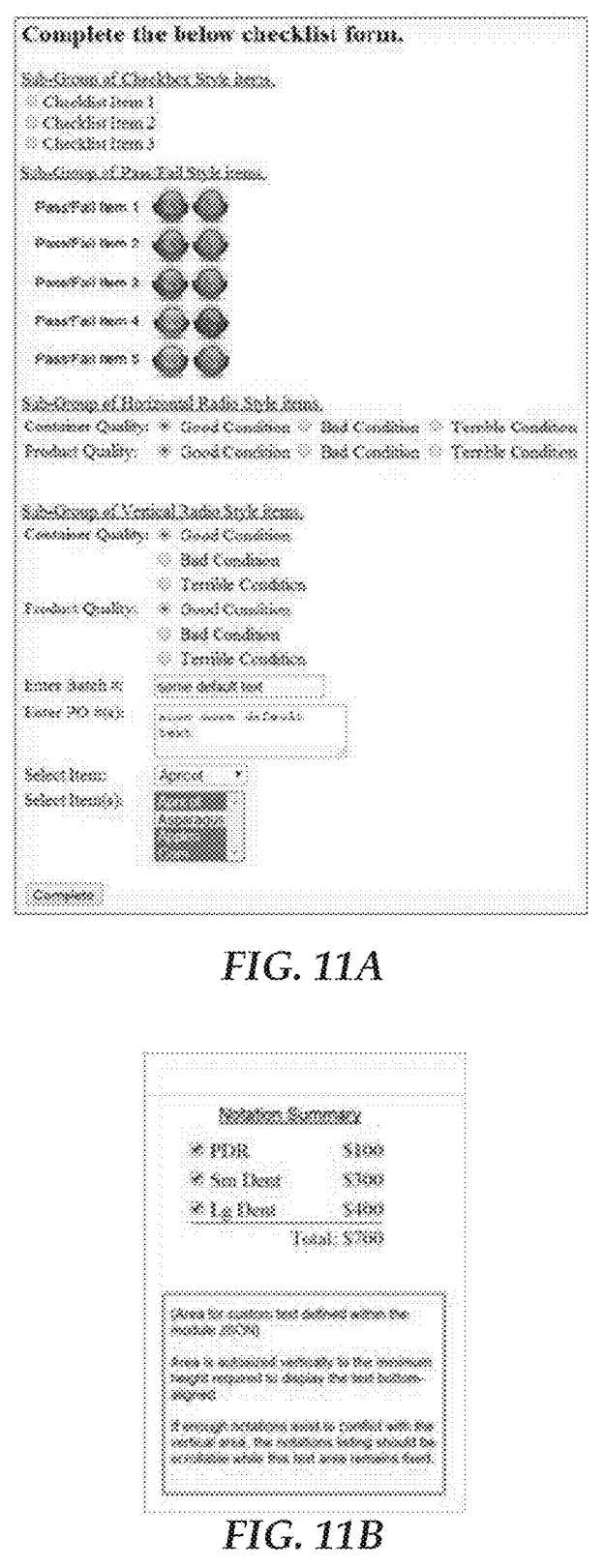

Each item on the checklist represents a specific metadata item that contains a Boolean value indicating the state of the checklist item at the time of transaction submission. The default value is defined by checklist type, but can be overridden in the template. Although the recorded state is Boolean, the context (representation) of the checklist option items can be expressed in various forms. Non-limiting examples of these Boolean forms include checkboxes, Pass/Fail icons or buttons, selectable radio buttons indicating various conditions, text boxes, and drop down lists. FIG. 11A shows an exemplary embodiment of a user interface generated by a checklist module included in a customized workflow.

As shown in FIG. 11A, in various embodiments, a checklist module male enable one or more checkboxes. A checkbox may be a typical HTML checkbox. Default is unchecked, but can be defaulted to True using a "Default" instruction set to "True" ("Default":"True"). Touching the checkbox toggles the state. Orientation of a checkbox may be vertical or horizontal.

Checklist modules may also enable pass/fail indicators, represented by "thumbs up" and "thumbs down" selectable icons, shown in FIG. 11A. Checklist modules may enable radio buttons to indicate a range of conditions (Good Condition, Bad Condition, Terrible Condition, and the like). Textboxes, drop down lists, and other sorts of user input mechanisms may be supported by various embodiments of checklist modules. The functionality of these mechanisms may be configured via module-specific instructions included in the configuration template.

In various embodiments, a checklist module supports a configurable form fields to capture any required transaction metadata. Form field types may include but are note include: Single-Line Text field, Multi-Line Text field, Checkbox, Radio Buttons, Pass/Fail, Select-List, Multi-Select-List, HTML Label (HTML formatted text, images).

Notations Summary and Cost Summation Modules

Transaction completion modules may also include modules that enable notating and summarizing the costs, as well as providing an "upsell" opportunity. At least one of these modules provides an up-sell summary view to the user, based on previously selected notations. Such notations will have been defined with optional "Cost" definition values. A checklist view of all applied notations are provided, with all checkboxes checked by default. For each notation that is associated with a "Cost" value definition, show the associated cost value in a separate column. At the end of the list of notations, sum the selected notation costs into a "Total:" row. The user can select/deselect any notation, causing the total to update accordingly. All selected notations and the total is saved to the transaction-level metadata such that it can be applied to a specific web view, as shown below. Note that these metadata may be extended by other, general metadata (ex: Make, Model, etc.), so this "package" of UpSell metadata must be stored in such a way to render a specific "UpSell" reporting view, separately from other basic metadata. FIG. 11B shows an exemplary embodiment of a user interface generated by a notation summary and cost summation module included in a customized workflow.

Generalized Operations

Figure 2:
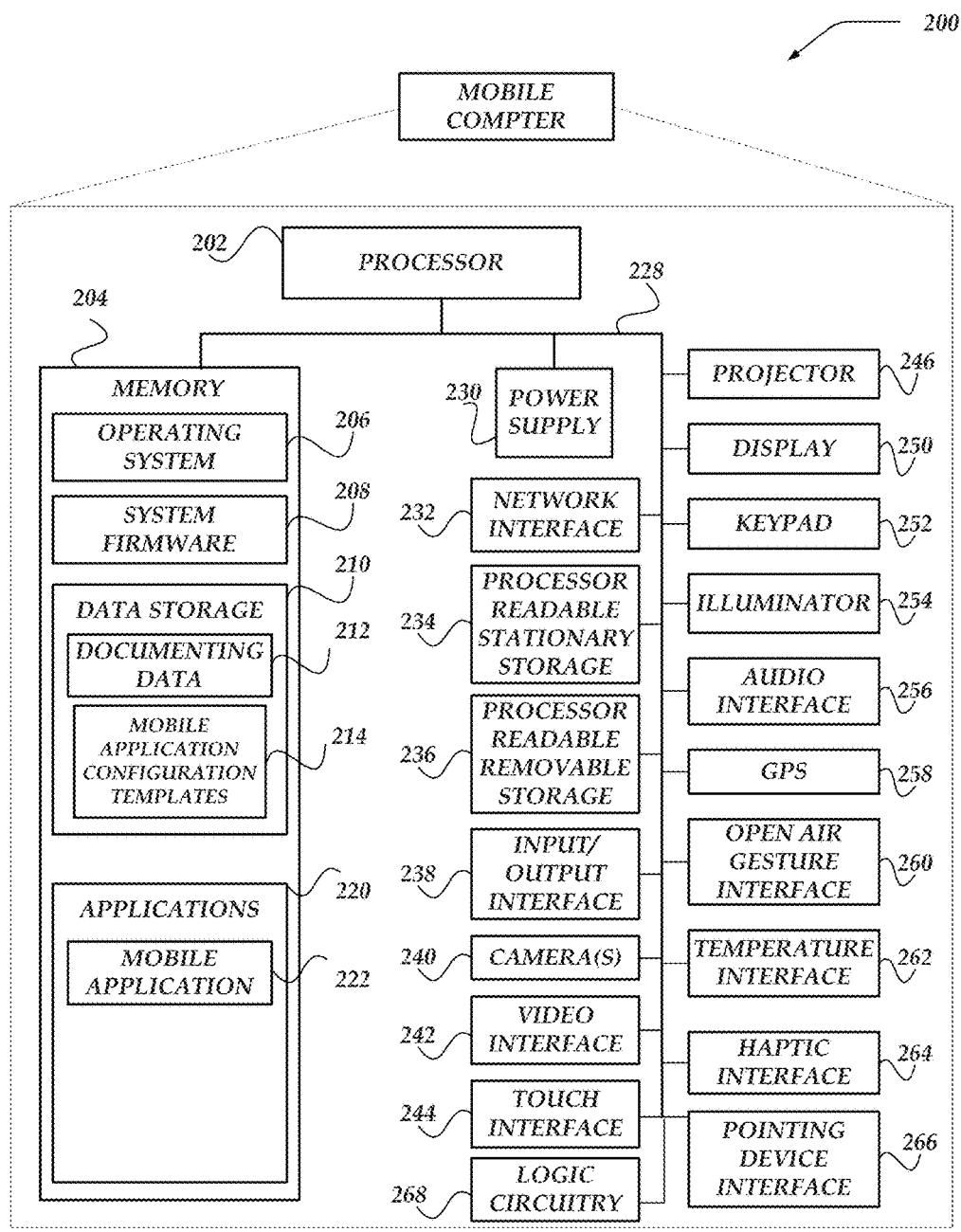
FIG. 2 shows an embodiment of a mobile computer that may be included in a system such as that shown in FIG. 1.

The operation of certain aspects of the invention will now be described with respect to FIGS. 4-5. In at least one of various embodiments, processes 400 and 500 described in conjunction with FIG. 405, respectively, or portions of these processes may be implemented by and/or executed on a network computer, such as network computer 300 of FIG. 3. In other embodiments, these processes or portions of these processes may be implemented by and/or executed on a plurality of network computers, such as network computer 300 of FIG. 3. Further, in other embodiments, these processes or portions of these processes may be implemented by and/or executed on one or more mobile computers, such as mobile computer 200 as shown in FIG. 2. Also, in at least one of the various embodiments, these processes or portions of these processes may be implemented by and/or executed on one or more cloud instances operating in one or more cloud networks. However, embodiments are not so limited and various combinations of network computers, client computer, cloud computer, or the like, may be utilized. These processes or portions of these processes may be implemented on any computer of FIG. 1, including, but not limited to user computers 102-108 or any computer included in DCP platform 140, such as CSC 110, DSC 120, or TSC 130.

Figure 4:
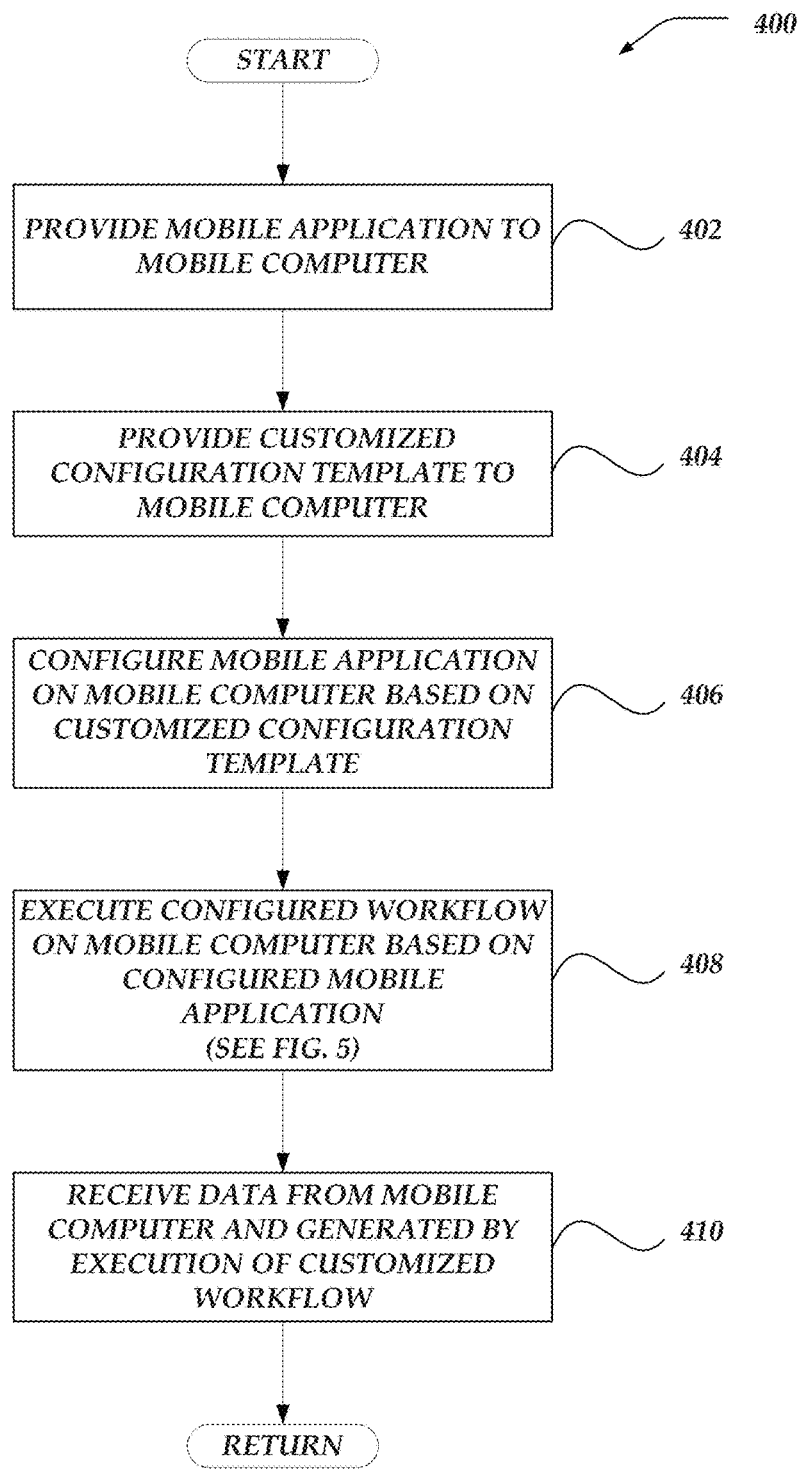
FIG. 4 shows an overview flowchart for a process to deploy a dynamically configurable mobile application and customized configuration templates for the mobile application that is consistent with the various embodiments.

FIG. 4 shows an overview flowchart for a process to deploy a dynamically configurable mobile application and customized configuration templates for the mobile application that is consistent with the various embodiments. Process 400 begins, after a start block, at block 402 where one or more mobile applications are provided to one or more mobile computers, such as but not limited to smartphone 106 and/or tablet 108 of FIG. 1. A platform, such as DCP platform 140 of FIG. 1 may provide the mobile application, via network 108.

The mobile application may be a compiled mobile application. As such, the mobile application may include machine-code instructions. The mobile application includes a plurality of modules. The plurality of modules may include, but are not otherwise limited to any of the executable modules discussed herein. The modules may also include machine-code instructions. In at least one embodiment, users of the one or more mobile applications may be agents, employees, clients, or customers of a client of a party that operates the DCP platform 140.

At block 404, one or more customized configuration templates are provided to the one or more mobile computers that were provided the mobile application at block 404. Briefly, a configuration template may include any structured data that configures the one or more mobile applications provided in block 402.

The one or more configuration templates may include a workflow definition that indicates, or at least defines, at least a subset of the plurality of modules to execute and/or employ in the configured workflow. When providing the workflow to the user, each of the modules included in the subset of modules may be executed at the mobile computer. The workflow definition may further indicate an ordered sequence of the subset of the plurality of the modules. When providing the workflow to the user, each of the modules included in the subset of modules may be executed at the mobile computer in the ordered sequence. As discussed herein, when executing the subset of modules, the configured workflow may enable the documenting a condition of tangible property. The mobile computer may be in an offline mode.

The one or more configuration templates may include an application canvas definition that indicates at least one of a font, background color, text color, and the like. When providing the workflow to the user, a user interface may be provided to the user based on the application canvas definition. The configuration template may include non-machine-code instructions that are specific to some of the modules included in the subset of the plurality of modules. When providing the workflow to the user, actions may be performed that are based on the non-machine-code instructions that are specific to the at least one of the modules.

In at least one embodiment, a configuration template may be a human readable template. In some embodiments, a configuration template may be structured in a JSON format or virtually any structured format. The configuration templates may have been previously provided to the DCP platform 140 by a client of the party that operates the DCP platform 140. The DCP platform 140 may store and provide the configuration temples via the CSC 110 of FIG. 1, or some other computer device included in the platform 140.

At block 406, the mobile application is configured based on the customized configuration template. In various embodiments, when the mobile application is launched on the mobile device, the customized configuration template is used to configure the mobile application. In at least some embodiments, the mobile application is configured at runtime without the need to re-compile the mobile application.

Configuring the mobile application may include executing at least a portion of the machine-code instructions included in the mobile application. The configuration templates may be parsed to determine the subset of the plurality of modules to execute to provide the workflow to the user. The configured mobile application may include a customized application canvas, a customized workflow, module-specific instructions, customized system variables and/or metadata, and the like.

At block 408, the configured mobile application is run on the mobile computer. In some embodiments, this may involve executing the configured workflow on the mobile computers based on the configured mobile application. When executing the workflow, each of the modules included in the workflow definition may be executed by the mobile application.

At block 410, data may be received by the DCP platform 140. For instance, media, image data, or other content documenting the condition of property may be received. Process 400 may terminate and/or returns to a calling process to perform other actions.

Figure 5:
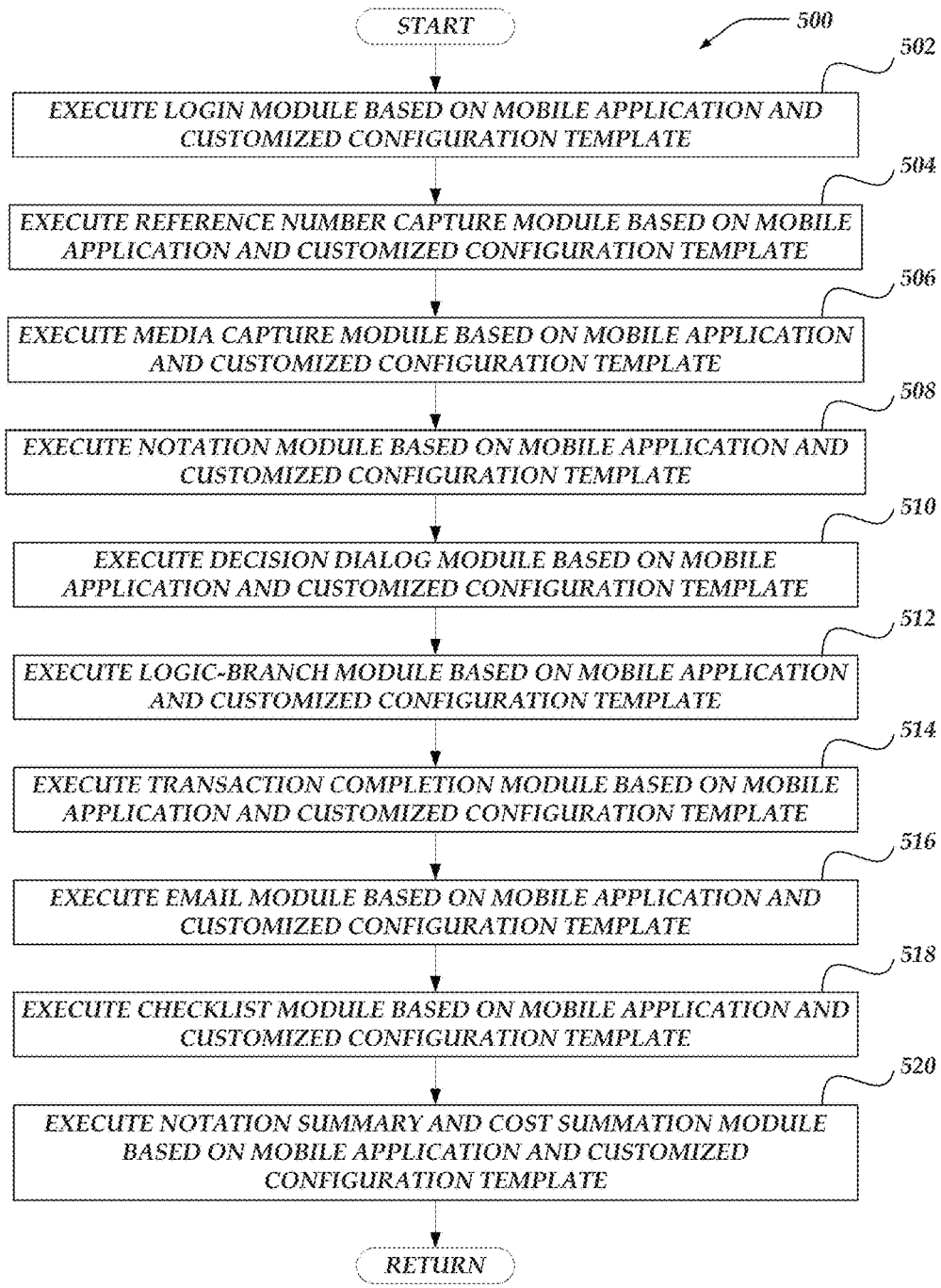
FIG. 5 shows an overview flowchart for a process to execute a customized workflow on a mobile device that is consistent with the various embodiments.

FIG. 5 shows an overview flowchart for a process to execute a customized workflow on a mobile device that is consistent with the various embodiments. In various embodiments, each of the modules included in the workflow definition are executed, at the mobile computer, during process 500. When executing each module, the execution may be based on the one or more customized configuration templates. The "look and feel" of each module may be customized by the canvas application parameters included in the configuration template. The module-specific instructions included in the configuration template may direct the execution of the corresponding modules. Accordingly, the execution and/or actions performed by the executed modules may be customized via the configuration template.

Process 500 is for an exemplary embodiment of a workflow. Process 500 begins, after a start block, at block 502, where a login module is executed at a mobile computer. At block 504, a reference number capture module is executed at the mobile computer. At block 506, a media capture module is executed at the mobile computer. At block 508, a notation module is executed at the mobile computer. At block 510, a decision dialog module may be executed at the mobile computer.

At block 512, a logic-branch module may be executed at the mobile computer. At block 514, a transaction completion module is executed at the mobile computer. At block 516, an email module is executed at the mobile computer. At block 518, a checklist module is executed at the mobile computer. At block 520, a notation summary and cost summary module is executed at the mobile computer. More or less modules may also be executed during process 500. Process 500 may terminate and/or returns to a calling process to perform other actions.

Illustrated Operating Environment

FIG. 1 shows components of one embodiment of an environment in which various embodiments of the invention may be practiced. Not all of the components may be required to practice the various embodiments, and variations in the arrangement and type of the components may be made without departing from the spirit or scope of the invention. As shown, system 100 of FIG. 1 may include configuration server computer (CSC) 110, documenting server computer (BSC) 120, transaction server computer (TSC) 130, user computers 102-108, and network 108.

In various embodiments, system 100 includes a documenting condition of property (DCP) platform 140. DCP platform 140 may include one or more server computers, such as but not limited to CSC 110, DSC 120, and TSC 130. DCP platform 140 may include one or more instances of mobile or network computers, including but not limited to any of mobile computer 200 of FIG. 2 and/or network computer 300 of FIG. 3. In at least one embodiment, DCP platform 140 includes at least one or more of the user computers 102-108. Although not shown, DCP platform 140 may include one or more data storage devices, such as rack or chassis-based data storage systems. Any of the databases discussed herein may be at least partially stored in data storage devices within DCP platform 140. As shown, any of the network devices, including the data storage devices included in DCP platform 140 may be accessible by other network devices, via network 108. DCP platform 140 may include one or more systems or sub-systems.

Various embodiments of user computers 102-108 are described in more detail below in conjunction with mobile computer 200 of FIG. 2. Furthermore, at least one embodiment of user computers 102-108 is described in more detail in conjunction with network computer 300 of FIG. 3. Briefly, in some embodiments, at least one of the user computers 102-108 may be configured to communicate with at least one mobile and/or network computer included in DCP platform 140, including but not limited to CSC 110, DSC 120, TSC 130, and the like. In various embodiments, one or more user computers 102-108 may be enabled to access, interact with, and/or view user interfaces, content, and the like provided by DCP platform 140, such as through a web browser. For instance, a user of computer such as but not limited to user computers 102-108 may be provided any of the user interfaces discussed herein. In at least one of various embodiments, a user of any of user computers 102-108 may be enabled to review content.

In at least one of various embodiments, user computers 102-108 may be enabled to receive content. User computers 102-108 may be enabled to communicate (e.g., via a Bluetooth or other wireless technology, or via a USB cable or other wired technology) with DCP platform 140. In some embodiments, at least some of user computers 102-108 may operate over a wired and/or wireless network to communicate with other computing devices, including any other of user computers 102-108 and/or any computer included in DCP platform 140.

Generally, user computers 102-108 may include computing devices capable of communicating over a network to send and/or receive information, perform various online and/or offline activities, or the like. It should be recognized that embodiments described herein are not constrained by the number or type of user computers employed, and more or fewer user computers—and/or types of user computers—than what is illustrated in FIG. 1 may be employed. At least one user computer 102-108 may be a client computer or a server computer.

Devices that may operate as user computers 102-108 may include various computing devices that typically connect to a network or other computing device using a wired and/or wireless communications medium. User computers 102-108 may include mobile devices, portable computers, and/or non-portable. Examples of non-portable computers may include, but are not limited to, desktop computers 102, personal computers, multiprocessor systems, microprocessor-based or programmable electronic devices, network PCs, or the like, or integrated devices combining functionality of one or more of the preceding devices. Examples of portable computers may include, but are not limited to, laptop computer 104. Examples of mobile computers include, but are not limited to, smart phone 106, tablet computers 108, cellular telephones, display pagers, Personal Digital Assistants (PDAs), handheld computers, wearable computing devices, or the like, or integrated devices combining functionality of one or more of the preceding devices. As such, user computers 102-108 may include computers with a wide range of capabilities and features.

User computers 102-108 may access and/or employ various computing applications to enable users to perform various online and/or offline activities. Such activities may include, but are not limited to, generating documents, gathering/monitoring data, capturing/manipulating images, reviewing content, managing media, managing financial information, playing games, managing personal information, browsing the Internet, or the like. In some embodiments, user computers 102-108 may be enabled to connect to a network through a browser, or other web-based application.

User computers 102-108 may further be configured to provide information that identifies the user computer. Such identifying information may include, but is not limited to, a type, capability, configuration, name, or the like, of the user computer. In at least one embodiment, a user computer may uniquely identify itself through any of a variety of mechanisms, such as an Internet Protocol (IP) address, phone number, Mobile Identification Number (MIN), media access control (MAC) address, electronic serial number (ESN), or other device identifier.

Various embodiments of CSC 110 are described in more detail below in conjunction with network computer 300 of FIG. 3. At least one embodiment of CSC 110 is described in conjunction with mobile computer 200 of FIG. 2. Briefly, in some embodiments, CSC 110 may be operative transmit and provide mobile applications and customized configuration templates that dynamically configure the mobile applications, as described by the various embodiments discussed herein. CSC 110 may be operative to communicate with user computers 102-108 to provide users of user computers 102-108 various mobile applications and customized configuration templates, as well as receive customized configuration templates from any of user computers 102-108.

Various embodiments of DSC 120 are described in more detail below in conjunction with network computer 300 of FIG. 3. At least one embodiment of DSC 120 is described in conjunction with mobile computer 200 of FIG. 2. Briefly, in some embodiments, DSC 120 may be operative to receive and/or transmit data that documents the condition of tangible property, including but not limited to image data to and from any of user computers 102-108 and generally carry out any task or process described herein, including, but not limited to any task or process regarding documenting data. DSC 120 may be operative to communicate with user computers 102-108 to provide users of user computers 102-108 108 various documenting data, such as image data from any of user computers 102-108.

Various embodiments of TSC 130 are described in more detail below in conjunction with network computer 300 of FIG. 3. At least one embodiment of TSC 130 is described in conjunction with mobile computer 200 of FIG. 2. Briefly, in some embodiments, TSC 130 may be operative to manage transactions involving tangible property. TSC 130 may be operative to communicate with user computers 102-108 to provide users of user computers 102-108. In at least one embodiment, the TSC 130 manage transactions involving tangible property between users of user computers 102-108.

Network 108 may include virtually any wired and/or wireless technology for communicating with a remote device, such as, but not limited to, USB cable, Bluetooth™, Wi-Fi™, or the like. In some embodiments, network 108 may be a network configured to couple network computers with other computing devices, including user computers 102-108 and the like. In at least one of various embodiments, sensors may be coupled to network computers via network 108, which is not illustrated in FIG. 1. In various embodiments, information communicated between devices may include various kinds of information, including, but not limited to, processor-readable instructions, remote requests, server responses, program modules, applications, raw data, control data, system information (e.g., log files), video data, voice data, image data, text data, structured/unstructured data, or the like. In some embodiments, this information may be communicated between devices using one or more technologies and/or network protocols.

In some embodiments, such a network may include various wired networks, wireless networks, or any combination thereof. In various embodiments, the network may be enabled to employ various forms of communication technology, topology, computer-readable media, or the like, for communicating information from one electronic device to another. For example, the network can include—in addition to the Internet—LANs, WANs, Personal Area Networks (PANs), Campus Area Networks, Metropolitan Area Networks (MANs), direct communication connections (such as through a universal serial bus (USB) port), or the like, or any combination thereof.

In various embodiments, communication links within and/or between networks may include, but are not limited to, twisted wire pair, optical fibers, open air lasers, coaxial cable, plain old telephone service (POTS), wave guides, acoustics, full or fractional dedicated digital lines (such as T1, T2, T3, or T4), E-carriers, Integrated Services Digital Networks (ISDNs), Digital Subscriber Lines (DSLs), wireless links (including satellite links), or other links and/or carrier mechanisms known to those skilled in the art. Moreover, communication links may further employ any of a variety of digital signaling technologies, including without limit, for example, DS-0, DS-1, DS-2, DS-3, DS-4, OC-3, OC-12, OC-48, or the like. In some embodiments, a router (or other intermediate network device) may act as a link between various networks—including those based on different architectures and/or protocols—to enable information to be transferred from one network to another. In other embodiments, remote computers and/or other related electronic devices could be connected to a network via a modem and temporary telephone link. In essence, the network may include any communication technology by which information may travel between computing devices.

The network may, in some embodiments, include various wireless networks, which may be configured to couple various portable network devices, remote computers, wired networks, other wireless networks, or the like. Wireless networks may include any of a variety of sub-networks that may further overlay stand-alone ad-hoc networks, or the like, to provide an infrastructure-oriented connection for at least user computers 102-108 and the like. Such sub-networks may include mesh networks, Wireless LAN (WLAN) networks, cellular networks, or the like. In at least one of the various embodiments, the system may include more than one wireless network.

The network may employ a plurality of wired and/or wireless communication protocols and/or technologies. Examples of various generations (e.g., third (3G), fourth (4G), or fifth (5G)) of communication protocols and/or technologies that may be employed by the network may include, but are not limited to, Global System for Mobile communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000 (CDMA2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), time division multiple access (TDMA), Orthogonal frequency-division multiplexing (OFDM), ultra wide band (UWB), Wireless Application Protocol (WAP), user datagram protocol (UDP), transmission control protocol/Internet protocol (TCP/IP), any portion of the Open Systems Interconnection (OSI) model protocols, session initiated protocol/real-time transport protocol (SIP/RTP), short message service (SMS), multimedia messaging service (MMS), or any of a variety of other communication protocols and/or technologies. In essence, the network may include communication technologies by which information may travel between user computers 102-108, computers included in DCP platform 140, other computing devices not illustrated, other networks, and the like.

In various embodiments, at least a portion of the network may be arranged as an autonomous system of nodes, links, paths, terminals, gateways, routers, switches, firewalls, load balancers, forwarders, repeaters, optical-electrical converters, or the like, which may be connected by various communication links. These autonomous systems may be configured to self-organize based on current operating conditions and/or rule-based policies, such that the network topology of the network may be modified.

Illustrative Mobile Computer

FIG. 2 shows one embodiment of mobile computer 200 that may include many more or less components than those shown. Mobile computer 200 may represent, for example, at least one embodiment of user computers 102-108, or a computer included in DCP platform 140. So, mobile computer 200 may be a mobile device (e.g., a smart phone or tablet), a stationary/desktop computer, or the like.

Mobile computer 200 may include processor 202, such as a central processing unit (CPU), in communication with memory 204 via bus 228. Mobile computer 200 may also include power supply 230, network interface 232, processor-readable stationary storage device 234, processor-readable removable storage device 236, input/output interface 238, camera(s) 240, video interface 242, touch interface 244, projector 246, display 250, keypad 252, illuminator 254, audio interface 256, global positioning systems (GPS) receiver 258, open air gesture interface 260, temperature interface 262, haptic interface 264, pointing device interface 266, or the like. Mobile computer 200 may optionally communicate with a base station (not shown), or directly with another computer. And in one embodiment, although not shown, an accelerometer or gyroscope may be employed within mobile computer 200 to measuring and/or maintaining an orientation of mobile computer 200.

Additionally, in one or more embodiments, the mobile computer 200 may include logic circuitry 268. Logic circuitry 268 may be an embedded logic hardware device in contrast to or in complement to processor 202. The embedded logic hardware device would directly execute its embedded logic to perform actions, e.g., an Application Specific Integrated Circuit (ASIC), Field Programmable Gate Array (FPGA), and the like.

Also, in one or more embodiments (not shown in the figures), the mobile computer may include a hardware microcontroller instead of a CPU. In at least one embodiment, the microcontroller would directly execute its own embedded logic to perform actions and access it's own internal memory and it's own external Input and Output Interfaces (e.g., hardware pins and/or wireless transceivers) to perform actions, such as System On a Chip (SOC), and the like.

Power supply 230 may provide power to mobile computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling mobile computer 200 to one or more networks, and is constructed for use with one or more communication protocols and technologies including, but not limited to, protocols and technologies that implement any portion of the OSI model, GSM, CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of mobile computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to events. For example, when illuminator 254 is active, it may backlight the buttons on keypad 252 and stay on while the mobile device is powered. Also, illuminator 254 may backlight these buttons in various patterns when particular actions are performed, such as dialing another mobile computer. Illuminator 254 may also cause light sources positioned within a transparent or translucent case of the mobile device to illuminate in response to actions.

Mobile computer 200 may also comprise input/output interface 238 for communicating with external peripheral devices or other computers such as other mobile computers and network computers. Input/output interface 238 may enable mobile computer 200 to communicate with one or more servers, such as CSC 110 of FIG. 1. In some embodiments, input/output interface 238 may enable mobile computer 200 to connect and communicate with one or more network computers, user computers 102-108 of FIG. 1. Other peripheral devices that mobile computer 200 may communicate with may include remote speakers and/or microphones, headphones, display screen glasses, or the like. Input/output interface 238 can utilize one or more technologies, such as Universal Serial Bus (USB), Infrared, Wi-Fi, WiMax, Bluetooth™, wired technologies, or the like.

Haptic interface 264 may be arranged to provide tactile feedback to a user of a mobile computer 200. For example, the haptic interface 264 may be employed to vibrate mobile computer 200 in a particular way when another user of a computer is calling. Temperature interface 262 may be used to provide a temperature measurement input and/or a temperature changing output to a user of mobile computer 200. Open air gesture interface 260 may sense physical gestures of a user of mobile computer 200, for example, by using single or stereo video cameras, radar, a gyroscopic sensor inside a computer held or worn by the user, or the like. Camera 240 may be used to track physical eye movements of a user of mobile computer 200.

GPS transceiver 258 can determine the physical coordinates of mobile computer 200 on the surface of the Earth, which typically outputs a location as latitude and longitude values. Physical coordinates of a mobile computer that includes a GPS transceiver may be referred to as geo-location data. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of mobile computer 200 on the surface of the Earth. It is understood that under different conditions, GPS transceiver 258 can determine a physical location for mobile computer 200. In at least one embodiment, however, mobile computer 200 may, through other components, provide other information that may be employed to determine a physical location of the mobile computer, including for example, a Media Access Control (MAC) address, IP address, and the like.

In at least one embodiment, GPS transceiver 258 is employed for localization of the various embodiments discussed herein. For instance, the various embodiments may be localized, via GPS transceiver 258, to customize the linguistics, technical parameters, time zones, configuration parameters, units of measurement, monetary units, and the like based on the location of a user of mobile computer 200. In a least one embodiment, a localization of at least a portion of any application included in mobile computer 200, such as but not limited to mobile application 222, is performed based on at least the geo-location data or other data acquired by GPS transceiver 258 or other sensors included in mobile computer 200. For instance, time zone parameters, currency type, units, language parameters, and the like are set or otherwise configured in various portions of software included in one or more mobile computers. Furthermore, any process discussed herein, including but not limited to any process discussed in the context of any flowchart described herein, may be localized as such.

Human interface components can be peripheral devices that are physically separate from mobile computer 200, allowing for remote input and/or output to mobile computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a mobile computer with such peripheral human interface components is a wearable computer, which might include a remote pico projector along with one or more cameras that remotely communicate with a separately located mobile computer to sense a user's gestures toward portions of an image projected by the pico projector onto a reflected surface such as a wall or the user's hand.

A mobile computer 200 may include a browser application that is configured to receive and to send web pages, web-based messages, graphics, text, multimedia, and the like. Mobile computer's 200 browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

In various embodiments, the browser application may be configured to enable a user to log into an account and/or user interface to access/view content data. In at least one of various embodiments, the browser may enable a user to view reports of assessment data that is generated by DCP platform 140 of FIG. 1. In some embodiments, the browser/user interface may enable the user to customize a view of the report. As described herein, the extent to which a user can customize the reports may depend on permissions/restrictions for that particular user. A user of mobile computer 200 may be provided features of the various platforms discussed herein, including any of the user interfaces discussed herein, such as but not limited to the user interfaces discussed in conjunction with FIGS. 4A-4D and FIG. 11, via the browser application of mobile computer 200.

Memory 204 may include RAM, ROM, and/or other types of memory. Memory 204 illustrates an example of computer-readable storage media (devices) for storage of information such as computer-readable instructions, data structures, program modules or other data. Memory 204 may store system firmware 208 (e.g., BIOS) for controlling low-level operation of mobile computer 200. The memory may also store operating system 206 for controlling the operation of mobile computer 200. It will be appreciated that this component may include a general-purpose operating system such as a version of UNIX, or LINUX™, or a specialized mobile computer communication operating system such as Windows Phone™, or the Symbian® operating system. The operating system may include, or interface with a Java virtual machine module that enables control of hardware components and/or operating system operations via Java application programs.

Memory 204 may further include one or more data storage 210, which can be utilized by mobile computer 200 to store, among other things, applications 220 and/or other data. For example, data storage 210 may store documenting data 212 and mobile application configuration templates 214. Data storage 210 may further include program code, data, algorithms, and the like, for use by a processor, such as processor 202 to execute and perform actions. In one embodiment, at least some of data storage 210 might also be stored on another component of mobile computer 200, including, but not limited to, non-transitory processor-readable removable storage device 236, processor-readable stationary storage device 234, or even external to the mobile device. Removable storage device 236 may be a USB drive, USB thumb drive, dongle, or the like.

Applications 220 may include computer executable instructions which, when executed by mobile computer 200, transmit, receive, and/or otherwise process instructions and data. Applications 220 may include mobile application 222. Mobile Application 222 may be used to document the condition of tangible property. In various embodiments, a workflow of mobile application 222 may be dynamically configured based on mobile application configuration templates 214, as described in the various processes herein.

Other examples of application programs that may be included in applications 220 include, but are not limited to, calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

So, in some embodiments, mobile computer 200 may be enabled to employ various embodiments, combinations of embodiments, processes, or parts of processes, as described herein. Moreover, in various embodiments, mobile computer 200 may be enabled to employ various embodiments described above in conjunction with computer device of FIG. 1.

Illustrative Network Computer

Figure 3:
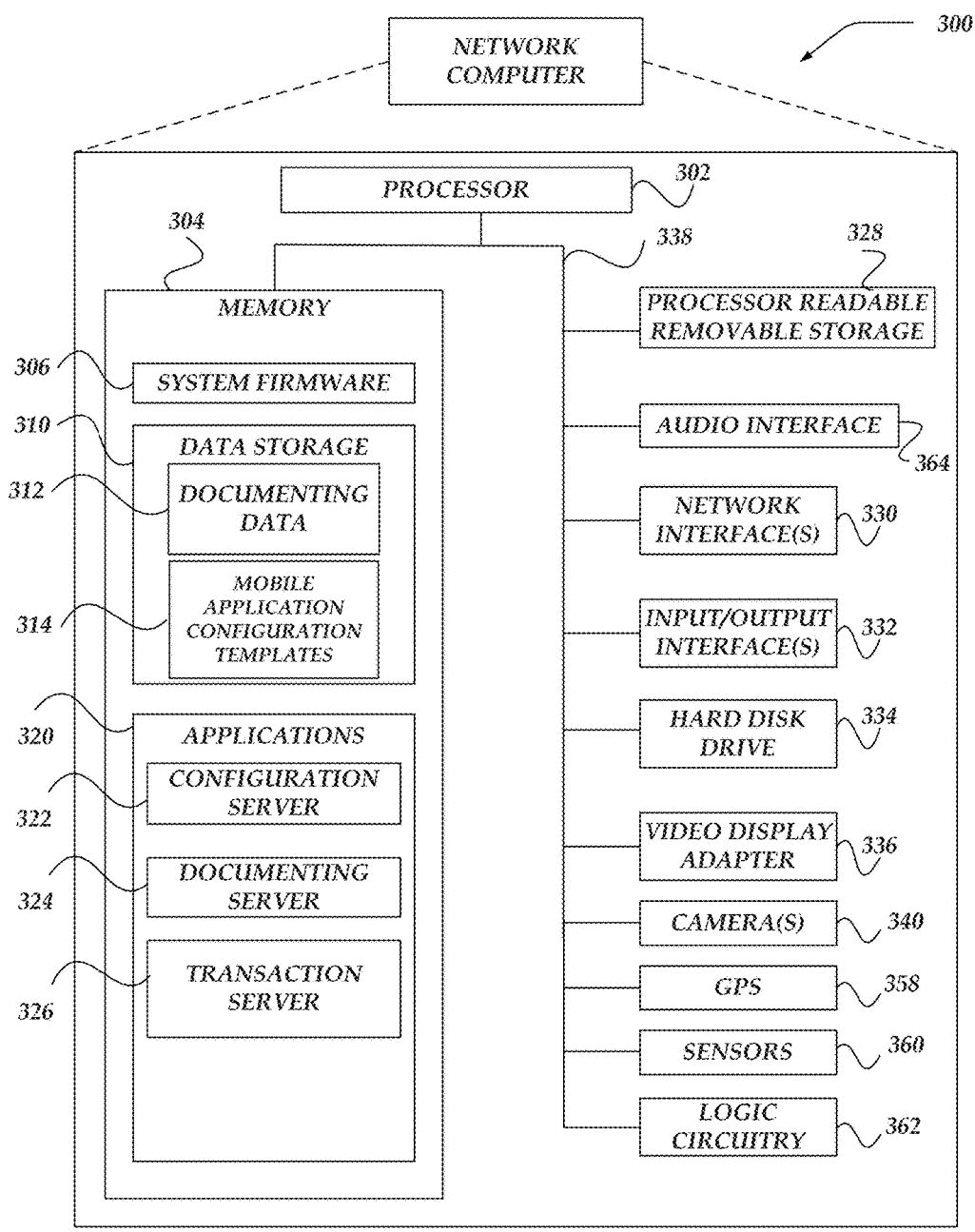
FIG. 3 illustrates an embodiment of a network computer that may be included in a system such as that shown in FIG. 1.

FIG. 3 shows one embodiment of network computer 300, according to one embodiment of the invention. Network computer 300 may represent, for example, at least one embodiment of user computers 102-108 or a computer included in DCP platform 140. Network computer 300 may be a desktop computer, a laptop computer, a server computer, a client computer, and the like.

Network computer 300 may include processor 302, such as a CPU, processor readable storage media 328, network interface unit 330, an input/output interface 332, hard disk drive 334, video display adapter 336, GPS 338, and memory 304, all in communication with each other via bus 338. In some embodiments, processor 302 may include one or more central processing units.

Additionally, in one or more embodiments (not shown in the figures), the network computer may include an embedded logic hardware device instead of a CPU. The embedded logic hardware device would directly execute its embedded logic to perform actions, e.g., an Application Specific Integrated Circuit (ASIC), Field Programmable Gate Array (FPGA), and the like.

Also, in one or more embodiments (not shown in the figures), the network computer may include a hardware microcontroller instead of a CPU. In at least one embodiment, the microcontroller would directly execute its own embedded logic to perform actions and access its own internal memory and its own external Input and Output Interfaces (e.g., hardware pins and/or wireless transceivers) to perform actions, such as System On a Chip (SOC), and the like.

As illustrated in FIG. 3, network computer 300 also can communicate with the Internet, cellular networks, or some other communications network (either wired or wireless), via network interface unit 330, which is constructed for use with various communication protocols. Network interface unit 330 is sometimes known as a transceiver, transceiving device, or network interface card (NIC). In some embodiments, network computer 300 may communicate with a user computer, or a computer included in an DCP platform 140, or any other network computer, via the network interface unit 320.

Network computer 300 also comprises input/output interface 332 for communicating with external devices, such as a various sensors or other input or output devices not shown in FIG. 3. Input/output interface 332 can utilize one or more communication technologies, such as USB, infrared, Bluetooth™, or the like.

Memory 304 generally includes RAM, ROM and one or more permanent mass storage devices, such as hard disk drive 334, tape drive, optical drive, and/or floppy disk drive. Memory 304 may store system firmware 306 for controlling the low-level operation of network computer 300 (e.g., BIOS). In some embodiments, memory 304 may also store an operating system for controlling the operation of network computer 300.

Although illustrated separately, memory 304 may include processor readable storage media 328. Processor readable storage media 328 may be referred to and/or include computer readable media, computer readable storage media, and/or processor readable storage device. Processor readable removable storage media 328 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

Memory 304 further includes one or more data storage 310, which can be utilized by network computer 300 to store, among other things, documenting data 312 and mobile application configuration templates 314. Furthermore, data storage 310 may further include program code, data, algorithms, and the like, for use by a processor, such as processor 302 to execute and perform actions. In one embodiment, at least some of data storage 310 might also be stored on another component of network computer 300, including, but not limited to processor-readable storage media 328, hard disk drive 334, or the like.

Documenting data 312 may include any data, including but not limited to image data, that documents the condition of tangible property. Mobile application configuration templates 314 may include data that is used to dynamically configure a mobile application, including but not limited to mobile application 222 of FIG. 2.

Applications 320 may include computer executable instructions that can execute on processor 302 to perform actions. In some embodiments, one or more of applications 320 may be part of an application that may be loaded into mass memory and run on an operating system.

Applications 320 may include configuration server 322, documenting server 324, and transactions server 326. Configuration server 322 may be operative transmit and provide mobile applications and customized configuration templates that dynamically configure the mobile applications. Likewise, documenting server 324 may be operative to receive and/or transmit data that documents the condition of tangible property. Transaction server 326 may be operative to manage transactions involving tangible property.

GPS transceiver 358 can determine the physical coordinates of network computer 300 on the surface of the Earth, which typically outputs a location as latitude and longitude values. Physical coordinates of a network computer that includes a GPS transceiver may be referred to as geo-location data. GPS transceiver 358 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 358 can determine a physical location for network computer 300. In at least one embodiment, however, network computer 300 may, through other components, provide other information that may be employed to determine a physical location of the mobile computer, including for example, a Media Access Control (MAC) address, IP address, and the like.

In at least one embodiment, GPS transceiver 358 is employed for localization of the various embodiments discussed herein. For instance, the various embodiments may be localized, via GPS transceiver 358, to customize the linguistics, technical parameters, time zones, configuration parameters, units of measurement, monetary units, and the like based on the location of a user of network computer 300. In a least one embodiment, a localization of at least a portion of any application included in network computer 300, such as but not limited to configuration server 322, documenting server 324, and transaction server 326, is performed based on at least the geo-location data or other data acquired by GPS transceiver 358 or other sensors included in network computer 300. For instance, time zone parameters, currency type, units, language parameters, and the like are set or otherwise configured in various portions of software included in one or more network computers. Furthermore, any process discussed herein, including but not limited to any process discussed in the context of any flowchart described herein, may be localized as such.

Audio interface 364 may be arranged to produce and receive audio signals such as the sound of a human voice. For example, audio interface 354 may be coupled to a speaker and microphone (not shown) to enable telecommunication with others and/or generate an audio acknowledgement for some action. A microphone in audio interface 364 can also be used for input to or control of network computer 300, e.g., using voice recognition, detecting touch based on sound, and the like. Likewise, a camera 340 may be included with network computer 300 to capture image and/or video data. Other sensors 360 may be included to sense a location, or other environment component.

Additionally, in one or more embodiments, the network computer 300 may include logic circuitry 362. Logic circuitry 362 may be an embedded logic hardware device in contrast to or in complement to processor 302. The embedded logic hardware device would directly execute its embedded logic to perform actions, e.g., an Application Specific Integrated Circuit (ASIC), Field Programmable Gate Array (FPGA), and the like.

So, in some embodiments, network computer 300 may be enabled to employ various embodiments, combinations of embodiments, processes, or parts of processes, as described herein. Moreover, in various embodiments, network computer 300 may be enabled to employ various embodiments described above in conjunction with computer device of FIG. 1.

The above specification, examples, and data provide a complete description of the manufacture and use of the composition of the invention. Since many embodiments of the invention can be made without departing from the spirit and scope of the invention, the invention resides in the claims hereinafter appended.

The embodiments of the invention in which an exclusive property or privilege is claimed are defined as follows:

1. A method for dynamically configuring a workflow for employing a mobile computer to document a condition of tangible property, wherein the mobile computer includes a processor, the method comprising:
    providing a mobile application to the mobile computer, wherein the mobile application includes machine-code instructions and a plurality of executable modules; and
    providing one or more configuration templates to the mobile computer, wherein the one or more configuration templates are stored in a JavaScript Object Notation (JSON) format and include a workflow definition that indicates a configuration for each module for at least a subset of the plurality of executable modules, and wherein
    when at least a portion of the machine-code instructions are executed by the processor included in the mobile computer, the workflow for employing the mobile computer to document the condition of the tangible property is dynamically re-configured at a run-time of the mobile application and provided to a user of the mobile computer by performing a first set of actions at the run-time of the mobile application that dynamically configures each module of the subset of the plurality of executable modules based on the workflow definition included in the one or more configuration templates, the first set of actions comprising:
        parsing, at the run-time of the mobile application and on the mobile computer, the one or more configuration templates;
        determining, at the run-time of the mobile application and on the mobile computer, the configuration for each module of the subset of the plurality of executable modules indicated by the workflow definition, wherein determining the configuration for each module is based on parsing the one or more configuration templates, wherein the subset of the plurality of executable modules includes at least a first module, a second module, a third module, and a signature decision module that is enabled to execute a logic branch; and
        executing, at the mobile computer, each of the modules included in the subset of the plurality of executable modules in a particular sequence based on the determined configuration for the corresponding module, wherein executing the first module includes automatically determining a number that identifies the tangible property based on image data generated by a camera of the mobile computer, and in response to determining that a record for the number does not exist, generating the record for the number, executing the second module includes generating, by the camera of the mobile computer, additional image data documenting the condition of the tangible property, executing the third module includes generating metadata that annotates the condition of the tangible property, and executing the logic branch of the signature decision module includes completing a transaction of documenting the condition of the property based on whether execution of the signature decision module captures a signature of the user.

2. The method of claim 1, further comprising:
    providing a second configuration template to the mobile computer, wherein the second configuration template includes a second workflow definition that is separate from the workflow definition and indicates a configuration for each module of at least a second subset of the plurality of modules, and wherein
    when the portion of the machine-code instructions are subsequently executed by the processor included in the mobile computer, a second workflow that is separate from the first workflow is configured at a second run-time of the mobile application and provided to the user of the mobile computer by performing a second set of actions that are separate from the first set of actions and comprising:
        parsing, at the second run-time of the mobile application and on the mobile computer, the second configuration template;
        determining, at the second run-time and on the mobile computer, the configuration for each module of the second subset of the plurality of modules included in the second workflow definition, wherein determining the configuration for each module is based on parsing the second configuration template; and
        executing, at the mobile computer, each of modules included in the second subset of the plurality of executable modules based on the determined configuration for the corresponding module.

3. The method of claim 1, wherein the workflow definition further indicates an ordered sequence of the subset of the plurality of the modules and the first set of actions further comprises:
    executing, at the mobile computer, each of the subset of the plurality of executable modules in the ordered sequence.

4. The method of claim 1, wherein the one or more configuration templates further include an application canvas definition that indicates at least one of a font, background color, or text color, and wherein
   executing at least one of the modules included in the subset of the plurality of modules includes providing a user interface to the user based on the application canvas definition.

5. The method of claim 1, wherein the one or more configuration templates further include non-machine-code instructions that are specific to at least one of the modules included in the subset of the plurality of modules, and wherein
   executing the at least one of the modules included in the subset of the plurality of executable modules includes performing additional actions that are based on the non-machine-code instructions that are specific to the at least one of the modules.

6. The method of claim 2, wherein the mobile application is a compiled mobile application that provides each of the workflow and the second workflow to the user without re-compiling the mobile application.

7. The method of claim 1, wherein when the portion of the machine-code instructions are executed by the processor included in the mobile computer, the mobile computer is configured in an off-line mode.

8. A system for configuring a workflow for employing a mobile computer that includes a processor to document a condition of tangible property, comprising:
   a network; and
   a network computer that performs a third set of actions comprising:
      providing a compiled mobile application over the network, from the network computer to the mobile computer, wherein the compiled mobile application includes machine-code instructions and a plurality of executable modules; and
      providing one or more configuration templates over the network to the mobile computer, wherein the one or more configuration templates are stored in a JavaScript Object Notation (JSON) format and include a workflow definition that indicates a configuration for each module of at least a subset of the plurality of executable modules, and wherein
      when at least a portion of the machine-code instructions are executed by the processor included in the mobile computer, the workflow for employing the mobile computer to document the condition for the tangible property is dynamically re-configured at a run-time of the mobile application and provided to a user of the mobile computer by performing a first set of actions at the run-time of the mobile application that dynamically configures each module of the subset of the plurality of executable modules based on the workflow definition included in the one or more configuration templates, the first set of actions comprising:
         parsing, at the run-time of the mobile application and on the mobile computer, the one or more configuration templates;
         determining, at the run-time of the mobile application and on the mobile computer, the configuration for each module of the subset of the plurality of executable modules indicated by the workflow definition, wherein determining the configuration for each module is based on parsing the one or more configuration templates and the subset of the plurality of executable modules includes at least a reference number module and a signature decision module that is enabled to execute a logic branch; and
         executing, at the mobile computer, each of the modules included in the subset of the plurality of executable modules in a particular sequence based on the determined configuration for the corresponding module and executing the reference number module includes automatically determining a number that identifies the tangible property based on image data generated by a camera of the mobile computer, and in response to determining that a record for the number does not exist, generating the record for the number, and executing the logic branch of the signature decision module includes completing a transaction of documenting the condition of the property based on whether execution of the signature decision module captures a signature of the user.

9. The system of claim 8, the third set of actions further comprising:
   providing a second configuration template to the mobile computer, wherein the second configuration template includes a second workflow definition that is separate from the workflow definitions and indicates a configuration for each module of at least a second subset of the plurality of modules, and wherein
   when, without re-compiling the mobile application, the portion of the machine-code instructions are subsequently executed by the processor included in the mobile computer, a second workflow that is separate from the first workflow is configured at a second run-time of the mobile application and provided to the user of the mobile computer by performing a second set actions that are separate from the first set of actions and comprising:
      parsing, at the second run-time of the mobile application and on the mobile computer, the second configuration template;
      determining, at the second run-time and on the mobile computer, the configuration for each module of the second subset of the plurality of modules included in the second workflow definition, wherein determining the configuration for each module is based on parsing the second configuration template; and
      executing, at the mobile computer, each of modules included in the second subset of the plurality of executable modules based on the determined configuration for the corresponding module.

10. The system of claim 8, wherein the workflow definition further indicates an ordered sequence of the subset of the plurality of the modules and the first set of actions further comprises:
   executing, at the mobile computer, each of the subset of the plurality of executable modules in the ordered sequence.

11. The system of claim 8, wherein the one or more configuration templates further include an application canvas definition that indicates at least one of a font, background color, or text color, and wherein
   executing at least one of the modules included in the subset of the plurality of modules includes providing a user interface to the user based on the application canvas definition.

12. The system of claim 8, wherein the one or more configuration templates further include non-machine-code instructions that are specific to at least one of the modules included in the subset of the plurality of modules, and wherein executing the at least one of the modules included in the subset of the plurality of executable modules includes performing additional actions that are based on the non-machine-code instructions that are specific to the at least one of the modules.

13. The system of claim 8, wherein executing each of the modules included in the subset of the plurality of modules enabling the user to document the condition of the tangible property.

14. The system of claim 8, wherein when the portion of the machine-code instructions are executed by the processor included in the mobile computer, the mobile computer is configured in an off-line mode.

15. A processor readable non-transitory storage media that stores a mobile application that includes machine-code instructions and a plurality of executable modules for dynamically re-configuring a workflow for employing a mobile computer to document a condition of tangible property, wherein the mobile computer includes a processor, when at least a portion of the machine-code instructions are executed by the processor, the workflow is dynamically re-configured and provided to a user of the mobile computer by performing a first set of actions comprising:

receiving, at the mobile computer, one or more configuration templates, wherein the one or more configuration templates are stored in a JavaScript Object Notation (JSON) format and include a workflow definition that indicates a configuration for each module of at least a subset of the plurality of executable modules;

parsing, at a run-time of the mobile application and on the mobile computer, the one or more configuration templates;

determining, at the run-time of the mobile application and on the mobile computer, the configuration for each module of the subset of the plurality of executable modules indicated by the workflow definition, wherein determining the configuration for each module is based on parsing the one or more configuration templates and the subset of the plurality of executable modules includes at least a reference number module and a signature decision module that is enabled to execute a logic branch; and executing, at the mobile computer, each of the modules included in the subset of the plurality of executable modules in a particular sequence based on the determined configuration for the corresponding module and executing the reference number module includes automatically determining a number that identifies the tangible property based on image data generated by a camera of the mobile computer, and in response to determining that a record for the number does not exist, generating the record for the number, and executing the logic branch of the signature decision module includes completing a transaction of documenting the condition of the property based on whether execution of the signature decision module captures a signature of the user.

16. The media of claim 15, wherein the workflow definition further indicates an ordered sequence of the subset of the plurality of the modules and the first set of actions further comprises:

executing, at the mobile computer, each of the subset of the plurality of executable modules in the ordered sequence.

17. The media of claim 15, wherein the one or more configuration templates further include an application canvas definition that indicates at least one of a font, background color, or text color, and wherein executing at least one of the modules included in the subset of the plurality of modules includes providing a user interface to the user based on the application canvas definition.

18. The media of claim 15, wherein the one or more configuration templates further include non-machine-code instructions that are specific to at least one of the modules included in the subset of the plurality of modules, and wherein executing the at least one of the modules included in the subset of the plurality of executable modules includes performing additional actions that are based on the non-machine-code instructions that are specific to the at least one of the modules.

19. The media of claim 15, wherein executing each of the modules included in the subset of the plurality of modules enabling a determination of a number that identifies tangible property, employing a camera device included in the mobile computer to generate image data of a a condition of the tangible property, and generating metadata that annotates the condition of the tangible property.

20. The media of claim 15, wherein when the portion of the machine-code instructions are executed by the processor included in the mobile computer, the mobile computer is configured in an off-line mode.

\* \* \* \* \*